(12) United States Patent
Ruf

(10) Patent No.: US 9,830,172 B2
(45) Date of Patent: Nov. 28, 2017

(54) IMPLEMENTING FUNCTIONAL KERNELS USING COMPILED CODE MODULES

(75) Inventor: Erik S. Ruf, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 732 days.

(21) Appl. No.: 13/539,349

(22) Filed: Jun. 30, 2012

(65) Prior Publication Data

US 2014/0007116 A1    Jan. 2, 2014

(51) Int. Cl.
    *G06F 9/45*           (2006.01)
    *G06F 9/445*         (2006.01)

(52) U.S. Cl.
    CPC ................. *G06F 9/44521* (2013.01)

(58) Field of Classification Search
    CPC ........................................................ G06F 8/41
    See application file for complete search history.

(56) References Cited

U.S. PATENT DOCUMENTS

| | | | |
|---|---|---|---|
| 5,590,332 A | 12/1996 | Baker | |
| 7,870,387 B1* | 1/2011 | Bhargava | G06F 21/52 713/165 |
| 2006/0149990 A1* | 7/2006 | S. et al. | 714/1 |
| 2007/0294681 A1* | 12/2007 | Tuck | G06F 11/3404 717/149 |
| 2008/0266413 A1* | 10/2008 | Cohen | G06T 5/20 348/222.1 |
| 2009/0187884 A1 | 7/2009 | Kryka et al. | |
| 2009/0307699 A1* | 12/2009 | Munshi et al. | 718/102 |
| 2011/0035737 A1* | 2/2011 | Stefansson | G06F 9/5072 717/149 |
| 2011/0138373 A1 | 6/2011 | Lane et al. | |
| 2012/0042306 A1* | 2/2012 | Kawahito | G06F 8/443 717/151 |
| 2012/0272224 A1* | 10/2012 | Brackman | G06F 9/44521 717/151 |
| 2013/0160016 A1* | 6/2013 | Gummaraju | G06F 9/5044 718/102 |
| 2013/0173894 A1* | 7/2013 | Yan | G06F 9/3885 712/228 |

OTHER PUBLICATIONS

Midtgaard, et al., "Control-Flow Analysis of Function Calls and Returns by Abstract Interpretation," retrieved at <<http://www.irisa.fr/celtique/jensen/ICFP09-ANFCFA.pdf>>, 14th ACM SIGPLAN International Conference on Functional Programming, Aug. 2009, 12 pages.

(Continued)

*Primary Examiner* — Li B Zhen
*Assistant Examiner* — Lenin Paulino
(74) *Attorney, Agent, or Firm* — Rainier Patents, P.S.

(57) ABSTRACT

A framework is set forth herein that uses a composition mechanism to produce function data that describes a kernel. The composition mechanism may then send the function data to an execution mechanism. The execution mechanism uses the function data to dynamically execute pre-compiled code modules, which are identified by the function data. According to another aspect, the framework provides different mechanisms for implementing the kernel, depending on the native capabilities of the execution mechanism.

22 Claims, 20 Drawing Sheets

(56) References Cited

OTHER PUBLICATIONS

Yang, et al., "Developing a High Performance GPGPU Compiler Using Cetus," retrieved at <<http://people.engr.ncsu.edu/hzhou/cetus_wksp.pdf>>, Cetus Users and Compiler Infrastructure Workshop, International Conference on Parallel Architectures and Compilation Techniques (PACT'11), Oct. 10, 2011, 4 pages.

Mainland, et al., "Nikola: Embedding Compiled GPU Functions in Haskell," retrieved at <<http://www.eecs.harvard.edu/~mainland/publications/mainland10nikola.pdf>>, Third ACM SIGPLAN Symposium on Haskell, Sep. 2010, 11 pages.

Nystrom, et al., "Firepile: Run-time Compilation for GPUs in Scala," retrieved at <<http://www.inf.usi.ch/nystrom/papers/firepile.pdf>>, Proceedings of the 10th ACM International Conference on Generative Programming and Component Engineering ,Oct. 2011, 9 pages.

Abelson, et al., "Structure and Interpretation of Computer Programs," retrieved at <<http://sites.google.com/site/guilinsun/sicp.pdf>>, MIT Press, 2nd Edition, 1985, 725 pages.

Buck, et al., "Brook for GPUs: Stream Computing on Graphics Hardware," retrieved at <<http://www.cs.cmu.edu/afs/cs/academic/class/15869-f11/www/readings/buck04_brook.pdf>>, ACM SIGGRAPH 2004 Papers, SIGGRAPH '04, 2004, pp. 777-786.

Guenter, et al., "Neon: A Domain-Specific Programming Language for Image Processing," retrieved at <<http://research.microsoft.com/pubs/144767/neonImageProcessingLanguage.pdf>>,Microsoft TechReport MSR-TR-2010-175, 2010, Microsoft Corporation, Redmond, WA, 8 pages.

Steele, Guy Lewis, "RABBIT: A Compiler for SCHEME," retrieved at <<http://dspace.mit.edu/bitstream/handle/1721.1/6913/AITR-474.pdf?sequence=2>>, MIT Artificial Intelligence Laboratory, Technical Report AITR-474, 1978, 282 pages.

"Pixel Bender Technology Center," retrieved at <<http://www.adobe.com/devnet/pixelbender.html>>, Adobe Systems Incorporated, San Jose, CA, 6 pages.

Landin, Peter J., "The Mechanical Evaluation of Expressions," retrieved at <<http://www.cs.cmu.edu/~crary/819-f09/Landin64.pdf>>, The Computer Journal, 6(4), 1964, pp. 308-320.

Lee, et al., "GPU Kernels as Data-Parallel Array Computations in Haskell," retrieved at <<http://gernot.web.cse.unsw.edu.au/~chak/papers/gpugen.pdf>>, Workshop on Exploiting Parallelism using GPUs and other Hardware-Assisted Methods, EPHAM 2009, 2009, 9 pages.

"DirectX 11 DirectCompute: a Teraflop for Everyone," retrieved at <<http://www.microsoft.com/download/en/details.aspx?displaylang=en&id=16995>>, retrieved on Jun. 21, 2012, Microsoft Corporation, Redmond, WA, 2 pages.

"Microsoft DirectX Developer Center," retrieved at <<http://msdn.microsoft.com/en-us/directx>>, retrieved on Mar. 23, 2012, Microsoft Corporation, Redmond, WA, 1 page.

"Parallel Programming and Computing Platform, CUDA," retrieved at <<http://www.nvidia.com/object/cuda_home_new.html, retrieved on Mar. 23, 2012, Nvidia, Santa Clara, CA, 3 pages.

Tarditi, et al., "Accelerator: Using Data Parallelism to Program GPUs for General-Purpose Uses," retrieved at <<http://citeseer.ist.psu.edu/viewdoc/download;jsessionid=EB612C4C75F376B71AD942E2C3638BBB?doi=10.1.1.187.8020&rep=rep1&type=pdf>>, Proceedings of the 12th International Conference on Architectural Support for Programming Languages and Operating Systems, 2006, 11 pages.

"MATLAB GPU Computing Support for NVIDIA CUDA-Enabled GPUs," retrieved at <<http://www.mathworks.in/discovery/matlab-gpu.html>>, retrieved Mar. 2012, The MathWorks, Inc., Natick, MA, 3 pages.

"NVIDIA GPU Computing Documentation" home page, retrieved at <<http://developer.nvidia.com/nvidia-gpu-computing-documentation>>, retrieved on Jun. 21, 2012, Nvidia, Santa Clara, CA, 9 pages.

"NVIDIA CUDA C Programming Guide," retrieved at <<http://developer.download.nvidia.com/compute/DevZone/docs/html/C/doc/CUDA_C_Programming_Guide.pdf>>, Version 4.2, Nvidia, Santa Clara, CA, Apr. 16, 2012, 173 pages.

"Tail call," retrieved at <<http://en.wikipedia.org/wiki/Tail_call>>, Wikipedia article, retrieved on Jun. 21, 2012, 9 pages.

\* cited by examiner

1. Function consFixedColor(Color color)

(Type of returned function: Pos → Color)

2. Function consMaskRect(Function child, Rect rect)

(Type of returned function: Pos → Color)

3. Function consXformRotateAround00(Function child, Number theta)

(Type of returned function: Pos → Color)

4. Function consBlend(Number ratio)

(Type of returned function: (Color * Color) → Color)

5. Function consApplyBlend(Function child1, Function child2, Function blender)

(Type of returned function: Pos → Color)

FIG. 5

1. Function redPlane = consFixedColor(Color(0xff0000ff))

2. Function redSquare = consMaskRect(redPlane, Rect(-.1, -.1, .1, .1))

3. Function redDiamond = consXformRotateAround00(redSquare, -PI/4)

4. Function blendEvenly = consBlend(0.5)

5. Function redStar = consApplyBlend( redSquare, redDiamond, blendEvenly)

FIG. 6

ILLUSTRATIVE CONSTRUCTOR MODULE FOR redSquare

Closure consMaskRect(Closure child, Rect rect) { byte *p;

int index = envAlloc(sizeof(Closure) + sizeof(Rect), p);
                ↑— 1. ALLOCATE SPACE IN THE ENVIRONMENT p[0..3] = child;  ←— 2. STORE CHILD FUNCTION IN THE ENVIRONMENT p[4..19] = rect;  ←— 3. STORE RECTANGLE DATA IN THE ENVIRONMENT return Closure(TAG maskRect, index);
      ↑— 4. BUILD AND RETURN THE redSquare FUNCTION
}

FIG. 8

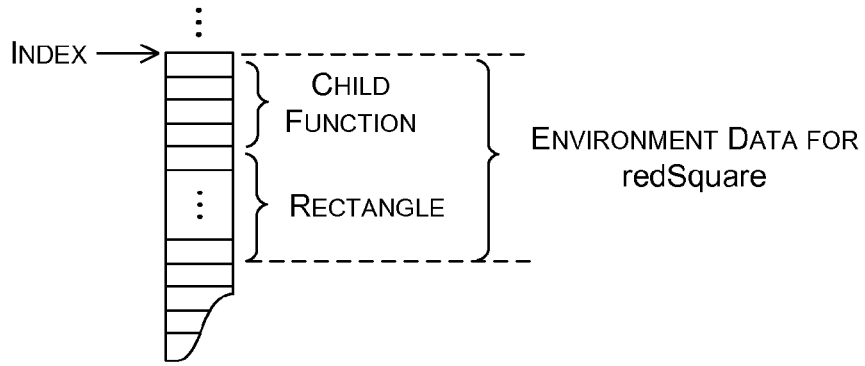

FIG. 9

ILLUSTRATIVE CONSTRUCTOR MODULE FOR redDiamond

```
Closure consXformRotateAround00(Closure child, float theta) { byte *p;

int index = envAlloc(sizeof(Closure) + 2*sizeof(float), p);
                                          ↰— 1. ALLOCATE SPACE IN THE ENVIRONMENT p[0..3] = child;        ⎫  2. STORE CHILD FUNCTION IN THE ENVIRONMENT
                            ⎭ p[4..7] = cos(-theta);  ⎫  3. COMPUTE TRANSFORMATION MULTIPLIERS FROM THE
                            ⎬     ROTATION ANGLE AND STORE IN THE ENVIRONMENT
    p[8..11] = sin(-theta); ⎭ return Closure(TAG xformRotateAround00, index);
}   ↰— 4. BUILD AND RETURN THE redDiamond FUNCTION
```

FIG. 10

EXECUTION MECHANISM 3 (DIRECT AND INDIRECT FUNCTION CALLS)

COMPARATIVE RESOURCE USAGE

| Version | Indirect Jumps | Direct Calls | Indirect Calls | Explict Stack Ops |
|---------|----------------|--------------|----------------|-------------------|
| Impl 1  | 10             | 0            | 0              | 8                 |
| Impl 2  | 10             | 2            | 0              | 2                 |
| Impl 3  | 8              | 2            | 2              | 2                 |

ILLUSTRATIVE DISPATCHER MODULE IMPLEMENTATION (FOR IMPLEMENTATION 1)

```
struct Closure { int tag; int index; };

void dispatch(in Closure f, in Closure k, inout Value v, inout Stack s) { while (1) { switch(f.tag) {          } 1. SWITCH BASED ON THE DESIGNATED FUNCTION
                                    STORED IN THE f REG case TAG return:  }  2. INVOKE "return" CODE WHEN f = return tag,
                return;          }  THEREBY EXITING THE DISPATCH LOOP

•
              •                                        3. INVOKE INLINED Mask
              •                                           Rect CODE MODULE
                                                          WHEN f = maskRect
            case TAG maskRect:                            tag, WITH DEFINED
                run code for Mask Rect code module for (f, k, v, s);   VALUES FOR
                break;                                    k, v, and s case TAG applyBlend:
                run code for Apply Blend code module for (f, k, v, s);
                break;
        }
    }
}
```

4. INVOKE INLINED Apply Blend CODE MODULE
   WHEN f = applyBlend tag, WITH DEFINED
   VALUES FOR k, v, and s

FIG. 16

ILLUSTRATIVE Mask Rect CODE MODULE IMPLEMENTATION (FOR IMPLEMENTATION 1)

```
void rect(inout Closure f, inout Closure k, inout Value v, inout Stack s) {
    byte *envp = &envBuf[f.index];

Closure child = envp[0..3];                    } 1. OBTAIN CHILD FUNCTION FROM
                                                      THE ENVIRONMENT float x0 = envp[4..7]; // bottom left x   ⎫
    float y0 = envp[8..11]; // bottom left y  ⎬ 2. DETERMINE CORNERS OF THE
    float x1 = envp[12..15; // top right x    ⎪    RECTANGLE FROM THE ENVIRONMENT
    float y1 = envp[16..19]; // top right y   ⎭ float x = v[0..3]; float y = v[4..7]; if ((x >= x0) & (x <= x1) & (y >= y0) & (y <= y1)) {
                                                          ↑
        f = child;     } 4. SET THE f REG TO THE         └── 3. PERFORM INCLUSION TEST
    }                    CHILD FUNCTION IF THE
                         INCLUSION TEST IS MET
    else { f = k;                      ⎫
        v = Color(0,0,0,0);         ⎬ 5. ELSE SET THE COLOR TO A DEFAULT VALUE, AND
    }                               ⎭    SET THE f REG TO THE k VALUE

ILLUSTRATIVE Rotate CODE MODULE IMPLEMENTATION (FOR IMPLEMENTATION 1)

```
void rotateAround00(inout Closure f, inout Closure k, inout Value v, inout Stack s) { byte *envp = &envBuf[f.index];

Closure child = envp[0..3];        } 1. OBTAIN CHILD FUNCTION FROM
                                          THE ENVIRONMENT float cos = envp[3..7];
    float sin = envp[8..11];           } 2. OBTAIN SINE AND COSINE DATA FROM THE
                                          ENVIRONMENT float x = v[0..3];                 } 3. RETRIEVE POSITION VALUES FROM THE
    float y = v[4..7];                    VALUE REGISTER float rx = cos * x - sin * y;      } 4. CALCULATE OUTPUT POSITION VALUES
    float ry = sin * x + cos * y;

v[0..3] = rx;                      } 5. STORE THE OUTPUT POSITION VALUES IN THE v REG
    v[4..7] = ry;

f = child;                         } 6. SET THE f REG TO THE CHILD FUNCTION

ILLUSTRATIVE Apply Blend CODE MODULE IMPLEMENTATION, PART I (FOR IMPL1)

```
void applyBlend(inout Closure f, inout Closure k, inout Value v, inout Stack s) { byte *envp = &envBuf[f.index];

push(k, s);   ← 1. SAVE THE CONTINUATION VALUE TO THE STACK push(v, s);   ← 2. SAVE THE INPUT VALUE TO THE STACK k.tag = TAG applyBlend k1;   ← 3. SET THE CONTINUATION VALUE TO
                                    DESIGNATE THE FIRST CONTINUATION k1 k.index = f.index;   ← 4. STORE A REFERENCE TO THE ORIGINAL FUNCTION'S
                            ENVIRONMENT IN THE UNUSED k.index FIELD f = envp[4..7];   ← 5. SET THE f REG TO DESIGNATE THE 2$^{ND}$ CHILD FUNCTION

ILLUSTRATIVE Apply Blend CODE MODULE IMPLEMENTATION, PART II (FOR IMPL 1)

void applyBlend k1(inout Closure f, inout Closure k, inout float4 v, inout Stack s) { byte *envp = &envBuf[f.index];

Value temp;

pop(temp, s);    ← 1. LOAD THE POSITION VALUE FROM THE STACK, AND REFER TO IT AS temp push(v, s);    ← 2. SAVE THE RETURN VALUE FROM THE $2^{ND}$ CHILD FUNCTION IN THE STACK k.x = TAG applyBlend k2;    ← 3. DESIGNATE THE NEXT CONTINUATION FUNCTION, k2 k.y = f.index ;    ← 4. REUSE THE CURRENT ENVIRONMENT BY MAKING k.y POINT TO THE ENVIRONMENT v = temp;    ← 5. SET THE v VALUE EQUAL TO THE POSITION VALUE f = envp[0..3];    ← 6. SET THE f REG TO THE $1^{ST}$ CHILD FUNCTION, TO BE EXECUTED NEXT

ILLUSTRATIVE Apply Blend CODE MODULE IMPLEMENTATION, PART III (FOR IMPL 1)

void applyBlend k2(inout Closure f, inout Closure k, inout float4 v, inout Stack s) { byte *envp = &envBuf[f.index];

float v2;

pop(v2, s);    ← 1. LOAD THE $2^{ND}$ CHILD FUNCTION'S VALUE FROM THE STACK. NOTE THAT THE $1^{ST}$ CHILD FUNCTION'S VALUE IS IN THE v REG.

pop(k, s);    ← 2. RESTORE THE CONTINUATION FUNCTION TO THE INITIAL CONTINUATION FUNCTION push(v2, s);    ← 3. PUSH v2 BACK ONTO THE STACK, WHICH CORRESPONDS TO THE Blend FUNCTION'S SECOND ARGUMENT f = envp[8..11];    ← 4. SET THE f REG TO DESIGNATE THE Blend FUNCTION

ILLUSTRATIVE Apply Blend CODE MODULE IMPLEMENTATION (FOR IMPLEMENTATION 2)

```
void applyBlend(inout Closure f, inout Value v, inout Stack s) {
    byte *envp = &envBuf[f.index];
    float4 temp = v;           ← 1. SAVE THE INPUT VALUE AS temp
    f = envp[4..7];            ← 2. SET THE f REG TO THE 2ND CHILD FUNCTION
    dispatch(f, v, s);         ← 3. INVOKE THE 2ND CHILD FUNCTION
    push(v, s);                ← 4. STORE THE RESULT OF THE 2ND CHILD FUNCTION TO THE STACK
    v = temp;                  ← 5. RESTORE THE INPUT VALUE
    f = envp[0..3];            ← 6. SET THE f REG TO 1ST CHILD FUNCTION
    dispatch(f, v, s);         ← 7. INVOKE THE 1ST CHILD FUNCTION
    f = envp[8..11];           ← 8. SET THE f REG FOR THE TAIL CALL
    return;                    ← 9. INVOKE THE THIRD CHILD FUNCTION VIA A TAIL CALL
}
```

FIG. 22

ILLUSTRATIVE Apply Blend CODE MODULE IMPLEMENTATION
(FOR IMPLEMENTATION 3, TAIL CONTEXT)

```
void applyBlendInTailContext(inout Closure f, inout Value v, inout Stack s) {
void applyBlend(inout Closure f, inout Value v, inout Stack s) { byte *envp = &envBuf[f.index];

float4 temp = v;    ←— 1. SAVE THE INPUT VALUE AS temp f = envp[4..7];    ←— 2. SET THE f REG TO THE 2ND CHILD FUNCTION (*funtableTC[f.tag])(f, v, s);    ←— 3. INVOKE THE 2ND CHILD VIA INDIRECT CALL push(v, s);    ←— 4. STORE THE RESULT OF THE 2ND CHILD FUNCTION TO THE STACK v = temp;    ←— 5. RESTORE THE INPUT VALUE f = envp[0..3];    ←— 6. SET THE f REG TO THE 1ST CHILD FUNCTION (*funtableTC[f.tag])(f, v, s);    ←— 7. INVOKE THE 1ST CHILD FUNCTION
                                          VIA INDIRECT CALL
    f = envp[8..11];    ←— 8. SET THE f REG FOR THE TAIL CALL return;    ←— 9. INVOKE THE THIRD CHILD FUNCTION VIA A TAIL CALL
}
```

FIG. 23

ILLUSTRATIVE Apply Blend CODE MODULE IMPLEMENTATION
(FOR IMPLEMENTATION 3, NON-TAIL CONTEXT)

```
void applyBlendInRecursiveContext(inout Closure f, inout Value v, inout Stack s) {
void applyBlend(inout Closure f, inout Value v, inout Stack s) { byte *envp = &envBuf[f.index];

float4 temp = v;        ←  1. SAVE THE INPUT VALUE AS temp f = envp[4..7];         ←  2. SET THE f REG TO THE 2ND CHILD FUNCTION (*funtableRC[f.tag])(f, v, s);  ←  3. INVOKE THE 2ND CHILD FUNCTION
                                       VIA INDIRECT CALL push(v, s);             ←  4. STORE THE RESULT OF THE 2ND CHILD FUNCTION X TO THE
                               STACK v = temp;               ←  5. RESTORE THE INPUT VALUE f = envp[0..3];         ←  6. SET THE f REG TO THE 1ST CHILD FUNCTION (*funtableRC[f.tag])(f, v, s);  ←  7. INVOKE THE 1ST CHILD FUNCTION
                                       VIA INDIRECT CALL f = envp[8..11];        ←  8. SET THE f REG FOR THE TAIL CALL TO THE
                               THIRD CHILD FUNCTION dispatch(f, v, s);      ←  9. EXECUTE THE TAIL CALL BY STARTING
                               A NEW DISPATCH LOOP return;                 ←  10. RETURN TO THE CALLER

ILLUSTRATIVE USE OF PLACEHOLDERS

Placeholder fp = consPlaceholder("f");  ⟵  1. CREATE THE PLACEHOLDER FUNCTION fp, FOR THE FUNCTION f Placeholder gp = consPlaceholder("g");  ⟵  2. CREATE THE PLACEHOLDER FUNCTION gp, FOR THE FUNCTION g Function f = consF(gp, ...);  ⟵  3. CREATE THE FUNCTION f, ONE OF THE ARGUMENTS BEING gp Bind(fp, f);  ⟵  4. ASSOCIATE fp WITH ITS ACTUAL VALUE f Function g = consG(fp, ...);  ⟵  5. CREATE THE FUNCTION g, ONE OF THE ARGUMENTS BEING fp Bind(gp, g);  ⟵  6. ASSOCIATE gp WITH ITS ACTUAL VALUE g Function h = consH(f, g, ...);  ⟵  7. CREATE THE FUNCTION h, HAVING ARGUMENTS f, g, . . .

finalize(h);  ⟵  8. OPTIONALLY FINALIZE FUNCTION h BEFORE EXECUTION runKernel(h, iterationSpace, ...);  ⟵  9. RUN THE FUNCTION h OVER AN ITERATION SPACE

FIG. 25

IMPLEMENTING FUNCTIONAL KERNELS USING COMPILED CODE MODULES

BACKGROUND

A parallel processing system includes a plurality of processing elements that evaluate a kernel over an iteration space. In one application, for instance, each processing element accepts an input data item in the iteration space, evaluates the input data item using the kernel, and stores a resultant output data item to a data structure, which may also be indexed by the iteration space.

In one approach, a user can produce a kernel by writing it in an appropriate source language. The user may then statically compile the entire source code file and load the resultant compiled source code on the parallel processing system. In another approach, the parallel processing system may perform runtime compilation on an intermediate language version of the kernel. These techniques provide good performance; however, for reasons sets forth herein, these techniques may not be entirely satisfactory for all applications of parallel processing systems.

SUMMARY

A framework is set forth herein that uses a composition mechanism to produce function data that parametrically describes a kernel. The composition mechanism may then transfer the function data to an execution mechanism. The execution mechanism uses the function data to dynamically execute pre-compiled code modules that are installed in the execution mechanism.

By virtue of the above-summarized approach, the framework can quickly produce kernels for execution in the execution mechanism (compared to, for instance, the case of static compilation). At the same time, the framework preserves some degree of runtime parameterization by virtue of its dynamic linking of pre-compiled code modules at runtime, as governed by the function data.

According to one illustrative aspect, the composition mechanism is run using a central processing unit (CPU) module. The execution mechanism may correspond to a graphical processing unit (GPU) module. The GPU module includes a plurality of threads, each of which executes an instance of the kernel with respect to a particular input data item.

According to another illustrative aspect, the framework provides different mechanisms for implementing the kernel, depending on the native capabilities of the execution mechanism. A first mechanism accommodates the case in which the execution mechanism provides no native support for function calling. A second mechanism accommodates the case in which the execution mechanism supports direct function calling, but not indirect function calling. A third mechanism accommodates the case in which the execution mechanism supports both direct and indirect function calling. In general, all implementations attempt to minimize the use memory in the execution mechanism, given the native constraints of the execution mechanism.

The above approach can be manifested in various types of systems, components, methods, computer readable storage media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 5 shows an illustrative collection of constructor modules used to produce respective functions.

FIG. 6 shows an illustrative collection of functions produced using the constructor modules of FIG. 5.

FIG. 7 also shows code modules associated with the functions of FIG. 6.

FIG. 8 shows pseudo-code that can be used to implement a particular constructor module.

FIG. 9 shows one manner in which an environment data structure may store construction-time parameter values, associated with a function produced using the constructor module of FIG. 8.

FIG. 10 shows pseudo-code that can be used to implement another type of constructor module.

FIG. 16 is an excerpt of pseudo-code that describes one manner of implementing a dispatcher module, for use in the first implementation (of FIG. 12).

FIGS. 17-21 show pseudo-code that can be used to implement various code modules, for use in conjunction with the first implementation (of FIG. 12).

FIG. 22 shows pseudo-code that can be used to implement a code module, for use in conjunction with the second implementation (of FIG. 13).

FIGS. 23 and 24 show pseudo-code that can be used to implement two code modules, for use in conjunction with the third implementation (of FIG. 14).

FIG. 25 is pseudo-code that illustrates one technique for producing a function using at least one placeholder function as an argument.

Figure 1:
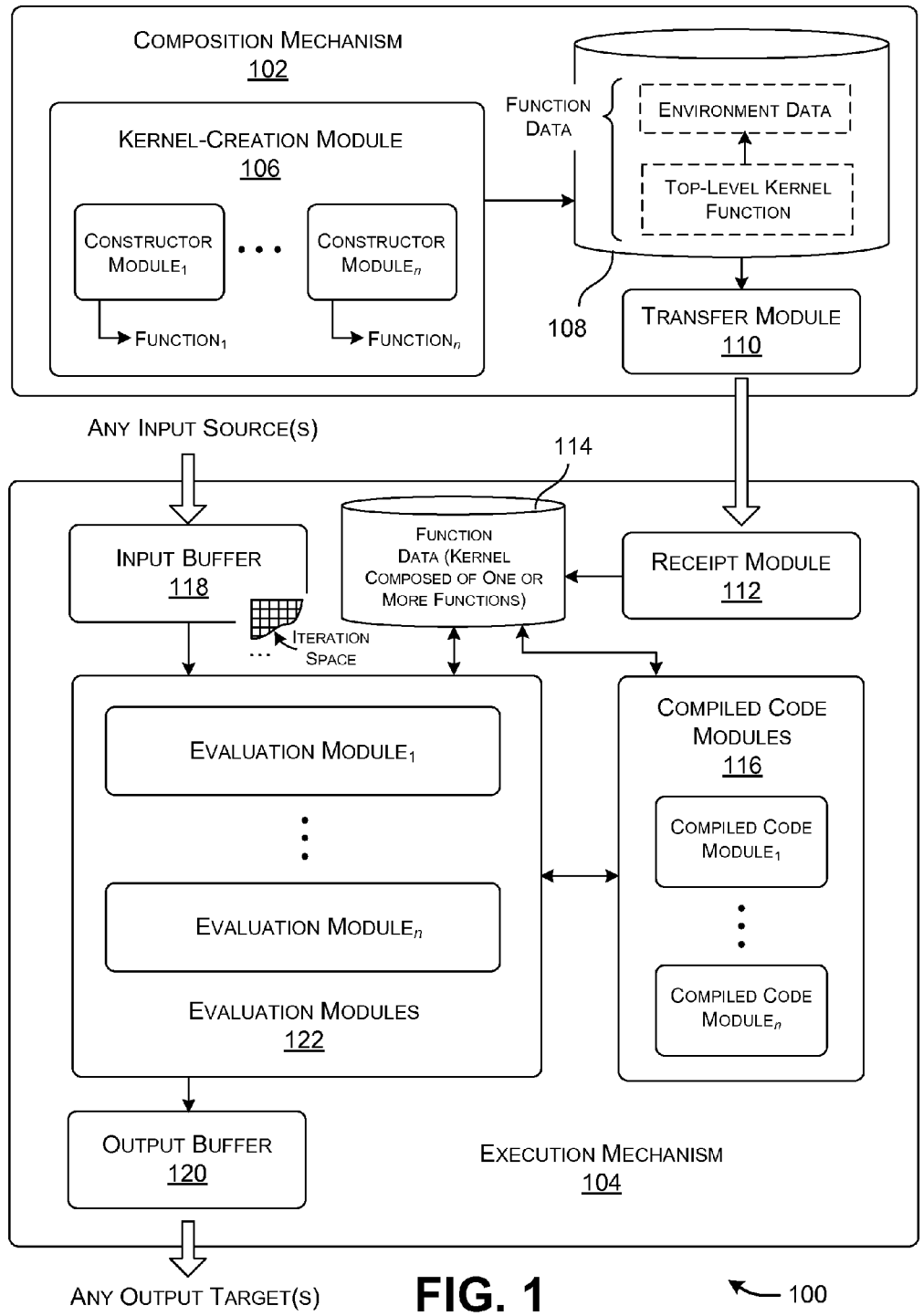
FIG. 1 shows a framework for creating a kernel using a composition mechanism, and for executing the kernel using a separate execution mechanism.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an overview of a framework for producing a kernel on a composition mechanism, and for executing the kernel on an execution mechanism. Section B provides further illustrative details regarding one implementation of the composition mechanism. Section C provides further illustrative details regarding one implementation of the execution mechanism. Section D sets forth representative variations of the mechanisms and techniques described in the proceeding sections. Section E describes illustrative computing functionality that can be used to implement any aspect of the features described in the proceeding sections.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software, hardware (e.g., chip-implemented logic functionality), firmware, etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. Section E, to be described in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software, hardware (e.g., chip-implemented logic functionality), firmware, etc., and/or any combination thereof.

As to terminology, the phrase "configured to" encompasses any way that any kind of physical and tangible functionality can be constructed to perform an identified operation. The functionality can be configured to perform an operation using, for instance, software, hardware (e.g., chip-implemented logic functionality), firmware, etc., and/or any combination thereof.

The term "logic" encompasses any physical and tangible functionality for performing a task. For instance, each operation illustrated in the flowcharts corresponds to a logic component for performing that operation. An operation can be performed using, for instance, software, hardware (e.g., chip-implemented logic functionality), firmware, etc., and/ or any combination thereof. When implemented by a computing system, a logic component represents an electrical component that is a physical part of the computing system, however implemented.

The phrase "means for" in the claims, if used, is intended to invoke the provisions of 35 U.S.C. §112, sixth paragraph. No other language, other than this specific phrase, is intended to invoke the provisions of that portion of the statute.

The following explanation may identify one or more features as "optional." This type of statement is not to be interpreted as an exhaustive indication of features that may be considered optional; that is, other features can be considered as optional, although not expressly identified in the text. Finally, the terms "exemplary" or "illustrative" refer to one implementation among potentially many implementations A. Overview FIG. 1 shows an illustrative framework 100 for producing and executing kernels. More specifically, the framework 100 includes a composition mechanism 102 for producing a kernel, and an execution mechanism 104 for executing the kernel. The composition mechanism 102 differs from the execution mechanism 104. For example, without limitation, the composition mechanism 102 may correspond to computing functionality which runs using one or more central processing unit (CPU) modules. The execution mechanism 104 may correspond to one or more graphical processing unit (GPU) modules. In another case, the execution mechanism 104 may correspond to a field programmable gate array (FPGA) module, and so on.

This section provides an overview of the composition mechanism 102 and the execution mechanism 104. Section B provides further details regarding the composition mechanism 102, while Section C provides further details regarding the execution mechanism 104.

The composition mechanism 102 may include a kernel-creation module 106 that includes, for a particular problem domain, a library of constructor modules (e.g., constructor module$_1$, . . . , constructor module$_n$), along with associated type information, constant information, etc. Each constructor module produces a function (also referred to as a closure) when it is invoked. A function specifies two pieces of information. A first piece of information provides a tag which identifies a code module for execution in the execution mechanism 104 (where that code module is associated with the function). A second piece of information specifies a location at which the function's construction-time parameter value(s) are stored.

In one case, the kernel-creation module 106 can produce a kernel which consists of a single function. To do so, the kernel-creation module 106 can invoke the constructor module associated with that function. In another case, the kernel-creation module 106 can produce a kernel which includes two or more logically-linked functions. For example, consider the simple case in which a kernel includes a single parent function that performs a task by calling on a single child function. The kernel-creation module 106 can produce this kernel by invoking the constructor module associated with the child function, which yields a child function. The kernel-creation module 106 can then invoke the constructor module associated with the parent function, to produce the parent function. That parent constructor module can accept, as one argument, the child function that has previously been determined. More generally, through this kind of process, a user can create a kernel of any complexity by "stringing together" any number of functions produced by invoking associated constructor modules. In one case, a user may construct the kernel by manually invoking appropriate constructor modules. In another case, a user may describe the kernel using any language (declarative and/or imperative), to produce a source file; an interpretation module (not shown) can then interpret the source file to automatically invoke the appropriate constructor modules that will achieve the operations described in the source file.

As the term is used herein, the kernel-creation module 106 is said to produce "function data." The function data parametrically defines the kernel using one or more functions. For cases in which the function data specifies two or more functions, the function data parametrically specifies the functions in such a manner that a caller-callee relationship is established between at least one pair of the functions. More specifically, the function data can be conceptualized as having a top-level kernel function associated with the kernel, which is associated with a corresponding top-level code module and parameter data (if any). The top-level kernel points to environment data stored in an environment data structure. The environment data can also be considered as part of the function data. The environment data provides parameter values associated with both the top-level function, and any child functions transitively invoked by the top-level function (should any such child functions exist). Note that the same top-level kernel function can exhibit different characteristics and behaviors by making reference to different environments. For instance, a first environment may specify different constant values compared to a second environment. In addition, or alternatively, a first environment can specify a different selection (and/or invocation order) of child functions compared to a second environment, and so on.

The composition mechanism 102 may store the function data in a data store 108. A transfer module 110 may then load the function data on the execution mechanism 104. This transfer of data can be performed in different ways for different respective application environments. In one case, a CPU-driven process on a computer can transfer the function data to the memory of a GPU module, which may correspond to a graphics card installed on the computer. In another case, a CPU-driven process on a computer can transfer the function data to a GPU module which is provided on some platform other than the computer, local or remote with respect to the computer, and so on.

Now referring to the execution mechanism 104, the execution mechanism 104 includes a receipt module 112 for receiving the function data and for storing it in a data store 210. Although not shown, the receipt module 112 can also load a set of pre-compiled code modules 116 (e.g., code module$_1$, . . . , code module$_n$) as part of a different process (or the same process). Each code module performs the operations associated with all functions produced in the kernel-creation module 106 by a counterpart constructor module. Hence, there is a code module for each corresponding constructor module in the kernel-creation module 106. Because the code modules 116 are already compiled, the execution mechanism 104 need not resort to runtime compilation to execute these modules.

The execution mechanism 104 further includes: an input buffer 118 for accepting input data from any input source(s); one or more evaluation modules 122 (e.g., evaluation module$_1$, . . . , evaluation module$_n$) for processing the input data to produce output data; and an output buffer 120 for providing the output data to any target destination(s). The input sources may correspond to any of: the composition mechanism 102; the execution mechanism 104; a separate input system, etc., or any combination thereof (That is, the execution mechanism 104 can be considered as a possible input source insofar as the execution mechanism 104 may perform further processing on previous data that it has output.) The target destinations may correspond to any of: the composition mechanism 102; the execution mechanism 104; a frame buffer of a display device, etc., or any combination thereof.

In one implementation, each evaluation module can accept an input data item selected from an iteration space, such as a pixel position within a two-dimensional array of pixel positions. The evaluation module can then perform some operation on the input data item using the kernel, drawing upon both the function data and the compiled code modules 116. The evaluation module can then output the result of its computation to any target destination(s). Overall, the evaluation modules 122 may perform the above-summarized operations in parallel with respect to different respective input data items in the iteration space, thus providing expedited processing of the input data over the iteration space.

Figure 2:
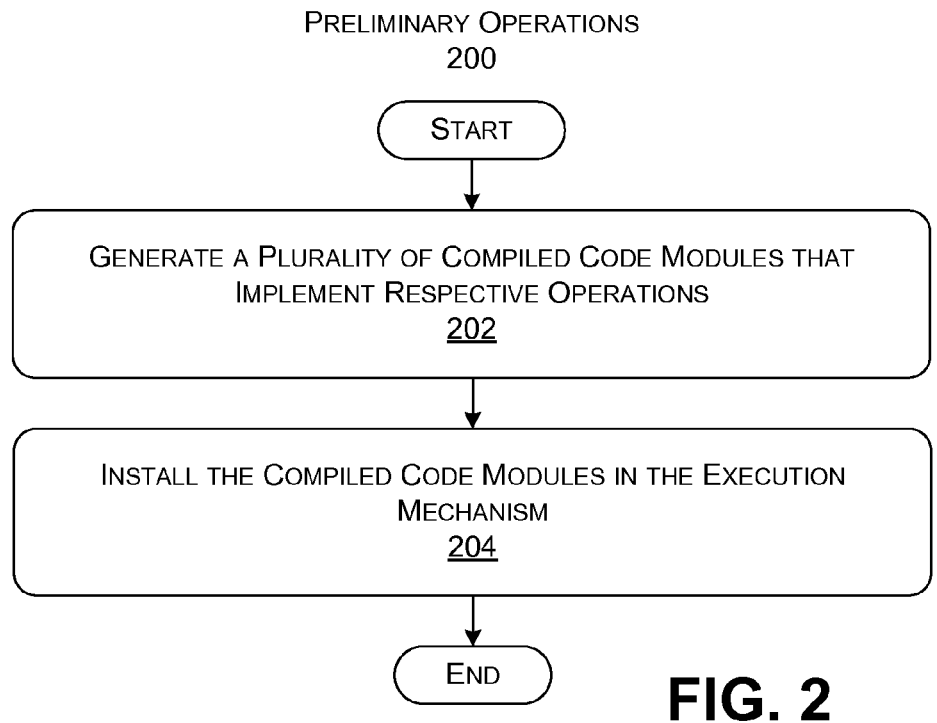
FIG. 2 is a flowchart that describes a procedure for producing compiled code modules and for installing the code modules in the execution mechanism.

FIG. 2 shows a procedure 200 for installing the code modules 116 in the execution mechanism 104. In block 202, the composition mechanism 102 and/or some other code generation system creates the compiled code modules 116. The code generation system can use any computer language to express the source code associated with these code modules 116, and any compilation technique to compile the source code. In block 202, a user (or automated process) installs the code modules 116 in the execution mechanism 104. Different execution mechanisms can use different strategies for storing and optionally internally duplicating the code modules 116.

Figure 3:
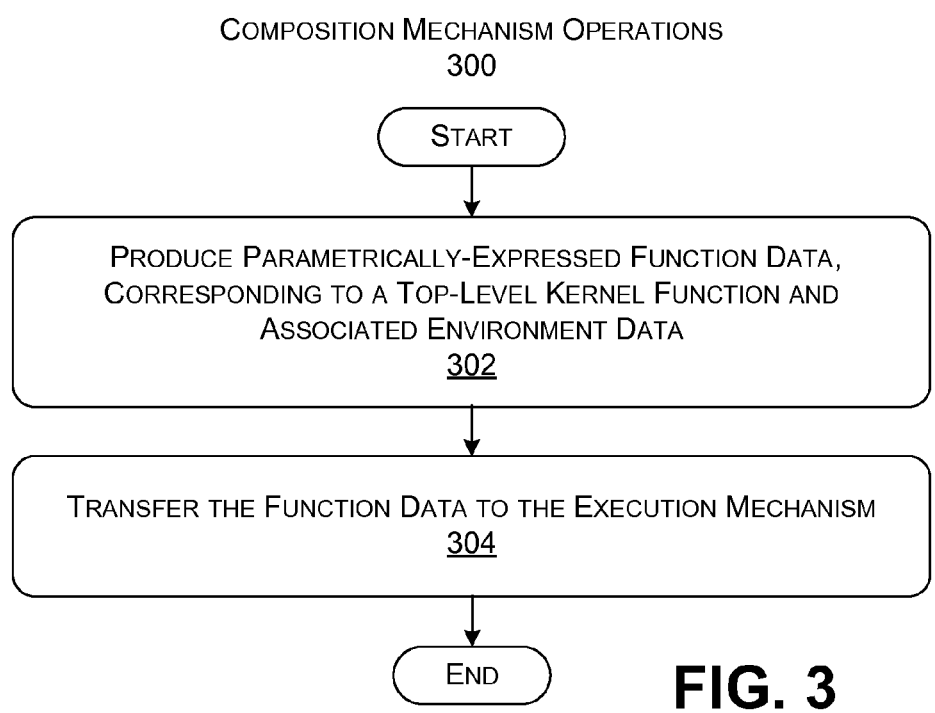
FIG. 3 is a flowchart that describes one manner by which the composition mechanism may produce function data which parametrically describes a kernel.

FIG. 3 shows a procedure 300 for producing the function data. In block 302, the kernel-creation module 106 produces function data which parametrically defines the kernel to be applied by the execution mechanism 104. As said, the function data may be conceptualized as including a top-level kernel function and associated environment data. In block 304, the composition mechanism 102 transfers the function data to the execution mechanism 104. This transfer may be performed by a user and/or an automated process.

Figure 4:
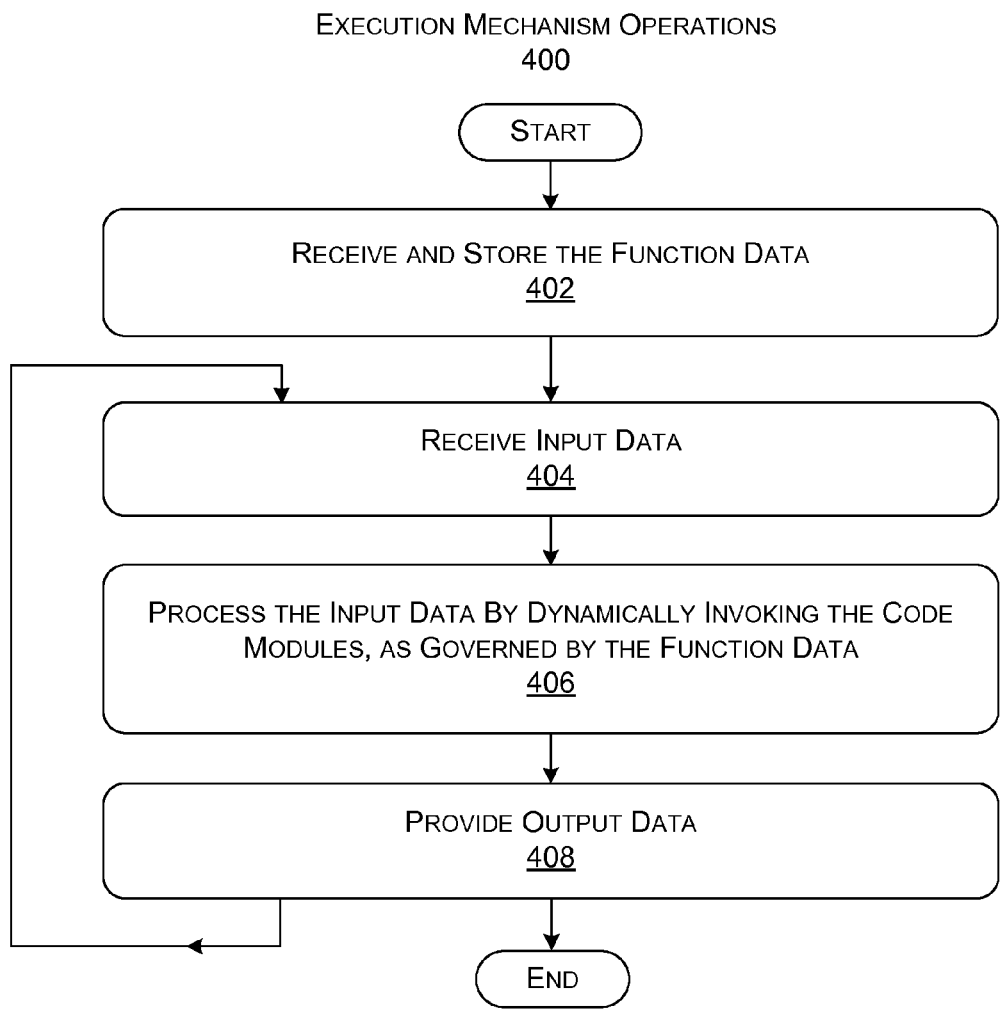
FIG. 4 is a flowchart that describes one manner by which the execution mechanism may execute a kernel, using the function data in conjunction with a set of pre-compiled code modules.

FIG. 4 shows a procedure 400 for executing the kernel in the execution mechanism 104. In block 402, the execution mechanism 104 receives and stores the function data. In block 404, the execution mechanism 104 receives input data for processing. In block 406, the execution mechanism 104 processes the input data by dynamically invoking the code modules, as governed by the parameterized information in the function data. This operation may entail using any number of evaluation modules to execute instances of the kernel on different respective input data items selected from the input data. This yields output data. In block 408, the execution mechanism 104 provides the output data to one or more target destinations. FIG. 4 includes a loop which indicates that the operations in blocks 404-406 can be repeated over the course of a processing operation, until some termination condition is reached.

The remainder of this overview section sets forth the nature of a particular kernel that may be produced by the composition mechanism 102. This kernel will serve as a running example throughout the Detail Description to explain the operation of both the composition mechanism 102 and the execution mechanism 104. While this kernel performs an image processing task, the framework 100 is not limited to producing kernels in the graphics domain. For example, the framework 100 can be used to produce kernels pertaining to business-related problems, scientific/engineering-related problems, and so on.

FIG. 5 provides pseudo-code that describes five different types of constructor modules. FIG. 6 shows representative functions that can be produced using respective constructor modules in FIG. 5.

The first constructor module (consFixedColor) accepts a constant color value as argument. It produces a function that outputs a constant color value regardless of input position. For example, the function redPlane of FIG. 6 is produced by this constructor module. This function outputs the color value of red for any input position (that is, by effectively ignoring the position value).

The second constructor module (consMaskRect) accepts a child function as one parameter value, and data that specifies a rectangle as a second parameter value. It produces a function that tests an input position to determine whether that position lies within the rectangle. If so, the function invokes the child function specified by its first parameter value; if not, the function outputs a default result. For example, the function redSquare of FIG. 6 is produced using this constructor module. The redSquare function determines whether an input position lies within the rectangle defined by the corner positions (−0.1, −0.1, 0.1, 0.1). If so, the redSquare function invokes the redPlane function (described above), to output the color red. Otherwise, the redSquare function outputs a transparent color value.

The third constructor module (consXformRotateAround00) accepts a child function as a first parameter value and a rotation angle (theta) as a second parameter value. It produces a function which rotates an input position value around zero by the number of radians specified by theta. The function then invokes the specified child function on the resultant position value. For example, the function redDiamond shown in FIG. 6 is produced using this constructor module. The function redDiamond rotates the input position by −π/4, and then applies the function redSquare to the resultant position value (which was described in the preceding paragraph).

In one implementation, the constructor module that produces redDiamond can store the original theta value in the environment data structure (along with the function that identifies redSquare). But in another case, the constructor module can perform any kind of preliminary transformation on the theta value and store the result of that transformation in the environment data structure. For example, the constructor module can take the sine and cosine of the theta value, and store the result of this computation in the environment data structure.

The fourth constructor module (consBlend) accepts a single numeric blend ratio as an input parameter value. This constructor module produces a function that accepts two input color values and then blends them together, based on the numeric blend ratio. The function blendEvenly of FIG. 6 is produced using this constructor module. The blendEvenly function blends together two input color values based on the constant blend ratio of 0.5.

The fifth constructor module (consApplyBlend) accepts parameter values which identify three child functions, the first two of which return color values computed from their (position-valued) arguments, while the third is used to blend the results obtained by invoking the first two. That is, this constructor module produces a function which uses the two child color functions to obtain two color values, and then uses the child blender function to blend the two color values together to produce a final output result. For example, the function redStar of FIG. 6 is produced using the consApplyBlend constructor module. The redStar function invokes the functions redSquare and redDiamond (described above) to produce two color values, and then uses the function blendEvenly to blend these two color values together, to produce a final output result of the kernel. In one implementation, the redStar function corresponds to the top-level function of the kernel.

Note that the kernel has a type corresponding to the top-level function redStar, which specifies the transformation of a position value into a color value. The child functions which are directly or indirectly linked to redStar also include this same type, except for the blendEvenly function, which accepts two color values and outputs a single color value. Suppose that an evaluation module expects to receive a kernel that has a type which transforms a position value into a color value. This means that the function blendEvenly could not, by itself, serve as the kernel, but it can be used as an internal component of a more encompassing kernel that conforms to the desired type.

Figure 7:
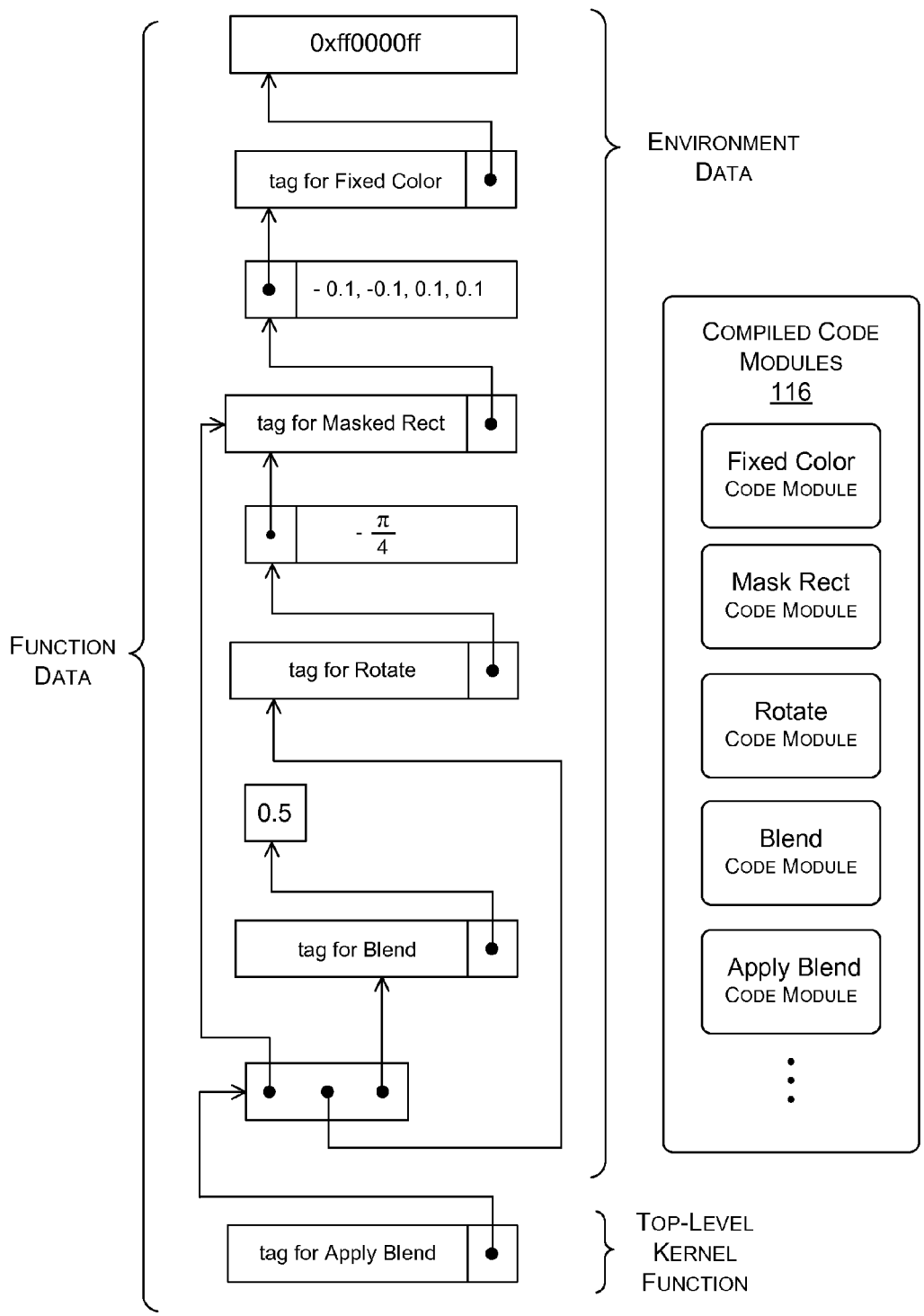
FIG. 7 shows function data that may be produced by the composition mechanism by linking together the functions shown in FIG. 6.

FIG. 7 shows logically-linked function data produced by the five constructor modules shown in FIG. 5. The function data includes a top-level function, associated with the redStar function. That top-level function makes reference to an environment data structure. The environment data structure defines all of the child function values and constant values that are directly or indirectly linked to the function redStar.

More specifically, as explained above, each function includes a pair of data values. A first member of the pair provides a tag which identifies the code module which will implement the associated function. The second member of the pair provides an index. That index identifies a location at which the parameter values associated with the function can be found in the environment data structure. The parameter values may include zero, one, or more child function values, and/or zero, one, or more constant values, etc.

FIG. 7 also illustrates a set of code modules 116 that can be used to execute the five functions. For example, a Fixed Color code module carries out the operations of the redPlane function; a Mask Rect code module carries out the operations of the redSquare function; a Rotate code module carries out the operations of the redDiamond function; a Blend code module carries out the operations of the operations of the blendEvenly function; and an Apply Blend code module carries out the operations of the redStar function.

In the example of FIG. 7, all parameter values in the function data are fixed at time of the construction, and hence may be referred to as construction-time parameters. In other implementations, one or more of the parameter values can be determined at runtime based on any consideration. For example, a kernel may choose a blending function at runtime based on any application-specific consideration.

In conclusion, the framework 100 illustrated in FIG. 1 has a number of potential advantages. For instance, by virtue of its use of pre-compiled code modules, together with parametrically-expressed function data, the framework 100 can quickly deploy new kernels (compared, for instance, to the case of static compilation of the entire kernel). At the same time, the framework preserves some degree of runtime parameterization by virtue of its dynamic linking of pre-compiled code modules at runtime. Overall, the framework 100 may be a useful solution in those environments where quick, yet flexible, deployment of kernels is desirable.

B. Illustrative Composition Mechanism Functionality

The following section provides additional illustrative details regarding the operation of the composition mechanism 102, and, in particular, the kernel-creation module 106. Starting with FIG. 8, this figure shows pseudo-code for implementing a constructor module which produces the redSquare function. In instruction (1), the constructor module allocates space in memory for storing the parameter values associated with the redSquare function. The parameter values include a function which identifies the child function redPlane, and the information which specifies the masking rectangle. Hence, the constructor module is asked to reserve enough space for storing this data in the environment data structure.

As a result of instruction (1), the constructor module returns an integer index value which identifies the start of the environment data structure at which the parameter values of the function are stored. The constructor module also provides a corresponding pointer value. That is, in one implementation, the execution mechanism 104 uses memory space that is disjoint from the memory space of the composition mechanism 102. The execution mechanism 104 uses the index value to identify the location of the parameter values, while the composition mechanism 102 uses the pointer value to identify the location of the parameter values. This is merely one referencing scheme; other implementations can use other strategies for identifying the location of a function in memory.

In instruction (2), the constructor module stores a value in the environment data structure which identifies the child function (in this case, redPlane). In this merely representative case, the child function value occupies four bytes of memory. In instruction (3), the constructor module stores the rectangular data in the environment data structure, immediately after the child function value.

In instruction (4), the constructor module builds the function associated with redSquare. Once again, the function includes two parts. A first part identifies a tag (TAG maskRect) of the code module (Mask Rect) which is associated with the function redSquare. The second part identifies the index, designating the starting location at which this function's parameter values are stored in the environment data structure.

FIG. 9 graphically depicts the manner in which the environment data structure may store the parameters associated with the function redSquare. The parameter values of this function start at location $Index_{redSquare}$. The environment data structure allocates continuous slots of memory thereafter for storing the parameter values. Hence, the execution mechanism 104 can later read out a particular parameter value from the environment data structure by advancing to an appropriate offset memory location with respect to $Index_{redSquare}$.

FIG. 10 shows pseudo-code for implementing a constructor module which produces the redDiamond function. In instruction (1), the constructor module allocates space in memory for storing the parameter values associated with the redDiamond function, returning an index value which points to a starting location in the environment data structure, along with a CPU pointer value. In instruction (2), the constructor module stores a value in the environment data structure which identifies the redSquare function. In instruction (3), the constructor module performs two transformations based on the specified value theta, and stores the results in the environment data structure. This example illustrates that a constructor module need not merely store its input parameter values; rather, it can also perform computations based on the input parameter values and then store the results of these computations in the environment data structure. In instruction (4), the constructor module builds the redDiamond function, which consists of a tag and an index value.

C. Illustrative Execution Mechanism Functionality

Figure 11:
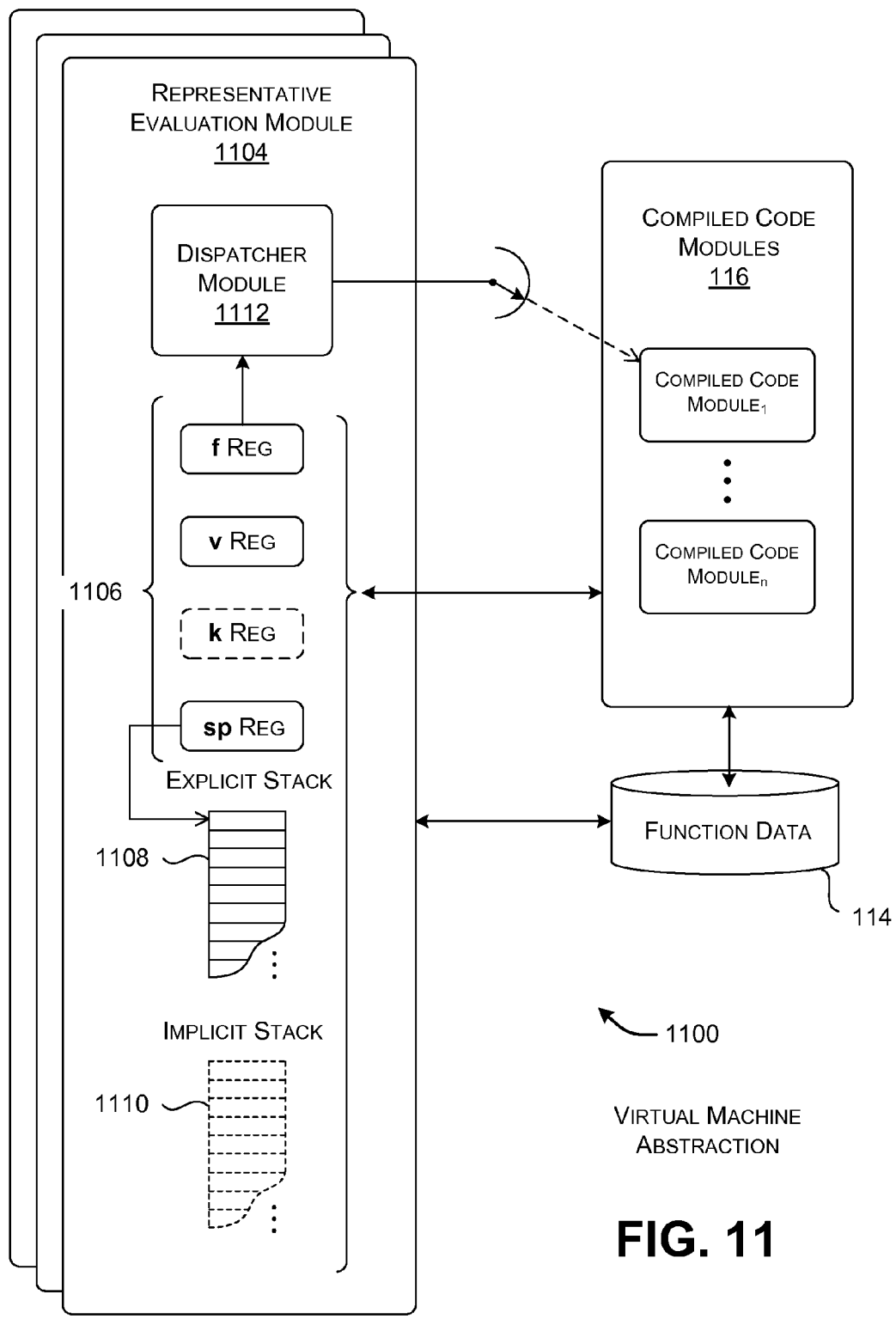
FIG. 11 depicts a virtual machine that may be used to execute a kernel in the execution mechanism.

FIG. 11 shows a virtual machine 1100 that can be used to execute an instance of the kernel in the execution mechanism 104, transforming an input data item of the input data (e.g., an input pixel position in an iteration space) into output data (e.g., an output pixel color value). Other instances of the virtual machine can execute other instances of the kernel with respect to other input data items (e.g., other data input pixel positions) of the input data.

The virtual machine 1100 stores the above-described function data in the data store 114. The function data provides all of the parameter values which define the kernel. The virtual machine 1100 also includes the above-described collection of code modules 116. The code modules 116 provide the logic which actually implements the operations associated with the functions.

The virtual machine 1100 also includes an evaluation module 1104 for executing an instance of the kernel, with respect to a particular input data item of the input data. It performs this task by dynamically executing the code modules 116, as governed by the parameter values provided in the function data. Other instances of the virtual machine 1100 include their own respective evaluation modules for operating on other input data items of the input data with respect to other instances of the kernel.

The evaluation module 1104 includes a plurality of per-position register stores 1106 for storing various values. In some implementations, for instance, a function value store (e.g., an f register for brevity) stores a function (f) value associated with a code module to be executed upon a next activation of the evaluation module 1104. In some implementations, an input/output value store (e.g., a v register) stores an input or output v value that is provided to (or provided by) an executing code module. In some implementations, a continuation store (e.g., a k register) stores a continuation (k) value that identifies a code module that is to be executed after the execution of the code module identified by the f value. In some implementations, an sp register stores an index sp value that identifies a location in a per-position explicit stack 1108. If used in a particular implementation, the explicit stack 1108 can be implemented using register memory and/or any other form of memory provided by the execution mechanism 104. In some implementations, the evaluation module 1104 also leverages a per-position implicit (native) stack 1110. For example, when performing a function call (if possible given the native capabilities of a particular platform), the evaluation module 1104 can store appropriate information on the implicit stack 1110; this ensures that any of the function's state required to perform computations after the child function returns will be preserved across the invocation of the child function.

The evaluation module 1104 may also include a dispatcher module 1112. Different implementations can use the dispatcher module 1112 in different ways (to be explained in detail below). In general, the dispatcher module 1112 executes a loop around a switch operation. Namely, upon invocation, the dispatcher module 1112 reads the f value stored in the f register. It then executes whatever code module is identified by the f value (that is, whatever code module is identified by the tag conveyed by the f value). An invoked code module can load a new f value into the f register, which prompts the dispatcher module 1112 to invoke a corresponding new code module, when the dispatcher module 1112 is next activated.

Figure 12:
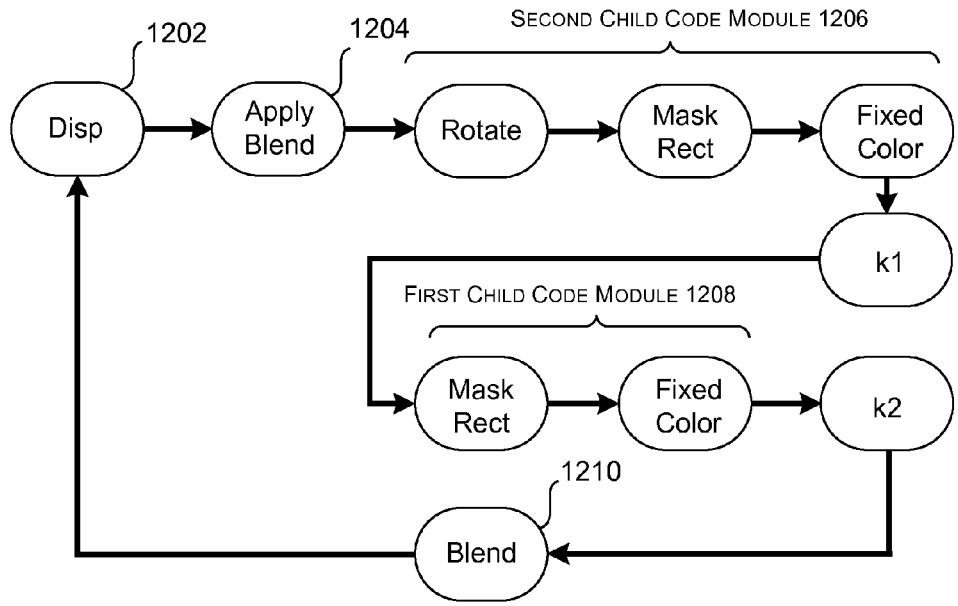
FIG. 12 shows a control transfer diagram that explains one manner of implementing a kernel in the execution mechanism. This diagram pertains to the case in which the execution mechanism has no native support for function calling.
Figure 13:
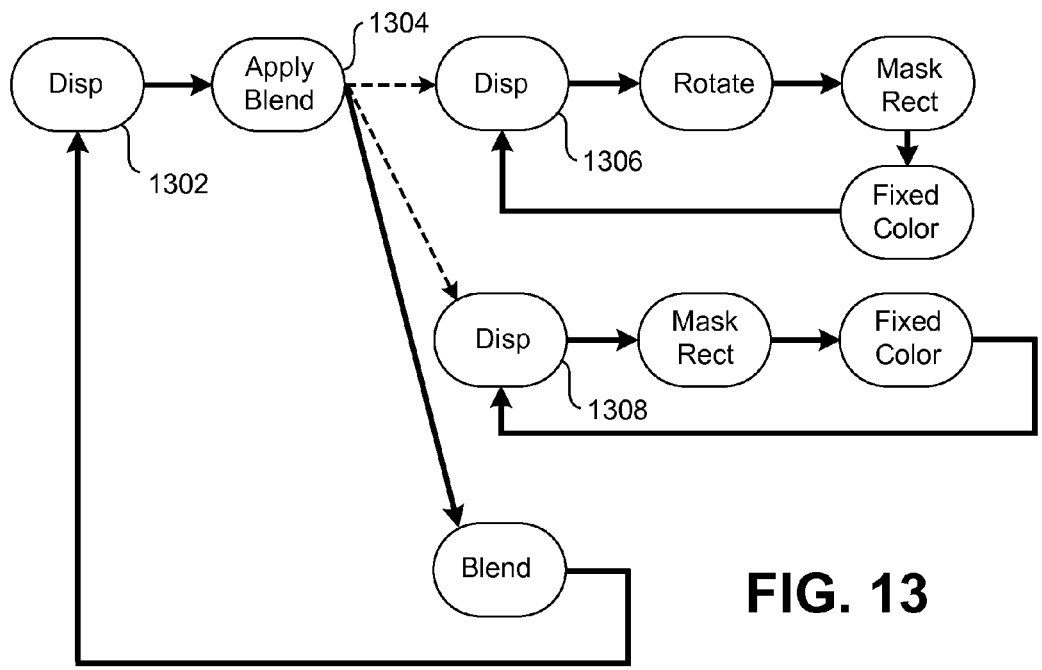
FIG. 13 shows a control transfer diagram that explains another manner of implementing a kernel in the execution mechanism. This diagram pertains to the case in which the execution mechanism has support for direct function calling, but not indirect function calling.
Figures 14, 15:
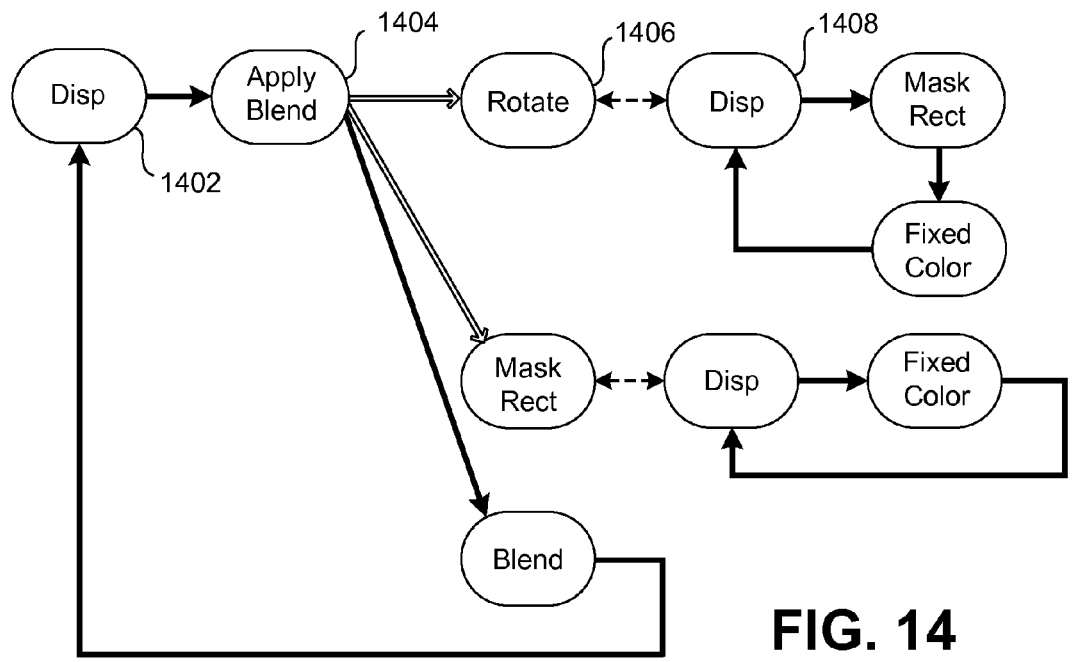
FIG. 14 shows a control transfer diagram that explains yet another manner of implementing a kernel in the execution mechanism. This diagram pertains to the case in which the execution mechanism provides support for both direct and indirect function calling.
FIG. 15 is a chart that describes the usage of resources by the three implementations depicted in FIGS. 12-14.

FIGS. 12-14 shows control transfer diagrams associated with three different implementations of the execution mechanism 104. Each implementation leverages the functionality shown in FIG. 11 in a different manner. As a preliminary matter, the following terminology informs the ensuing explanation. Consider a parent code module which invokes at least one child code module. The line in the parent code module which invokes the child code module is referred to as an invocation site, e.g., a call site in certain cases. In a first case, the invocation site is the last reachable operation performed by the parent code module (although it may not be the last statement in the code, from a syntactical perspective). That site is referred to herein as a tail site. In a second case, the invocation site is not the last operation performed by the parent code module. That is, after the child code module performs its operations, the parent code module performs additional operations. That kind of site is referred to herein as a non-tail site.

For example, consider the code module associated with the redStar function. As will be clarified below, this code module invokes the Blend code module as a tail invocation, but it invokes the Rotate and Mask Rect code modules as non-tail invocations. Non-tail invocations may make greater use of stack memory, compared to tail invocations. This is because the virtual machine 1100 must save any portion of the calling function's state that might be required by computations taking place after the non-tail invocation returns. Tail call optimization (also referred to as tail call elimination) refers to provisions for reducing stack growth by avoiding unnecessary stack operations in the evaluation of tail invocations, whenever possible.

A first implementation (associated with FIG. 12) is designed for use in an execution mechanism that provides no native support for function calling of any type. A second implementation (associated with FIG. 13) is designed for use in an execution mechanism that supports direct function calling. The virtual machine 1100 uses the implicit stack 1110 of the virtual machine 1100 to perform direct function calling. But the execution mechanism in the second implementation does not provide a dynamic mechanism for specifying call targets. In other words, the execution mechanism does not accommodate the use indirect function calling. A third implementation (associated with FIG. 14) is designed for an execution mechanism that also supports indirect function calling, e.g., via function pointers or object systems with virtual functions. As an overarching goal, all implementations attempt to minimize the use stack memory when invoking child functions.

As a prefatory note, FIGS. 12-14 indicate that the virtual machine 1100 implements the second child function (redDiamond) prior to the first child function (redSquare), where the qualifiers "first" and "second" refer to the order in which these functions appear as arguments in the redStar function. In this particular case (although not necessarily true in the general case), the same result is produced regardless of whether the first child function follows the second child function, or vice versa. Nevertheless, in this particular case, the implementations can produce a more efficient use of memory by executing the second child function prior to the first child function. As another preliminary note, FIGS. 12-14 will be principally explained in the context of the names of the compiled code modules (Apply Blend, Mask Rect, Fixed Color, Rotate, and Blend), rather than the corresponding function names (redStar, redSquare, red-Plane, redDiamond, and blendlyEvenly, respectively).

In the case of FIG. 12, the virtual machine 1100 uses a continuation-passing style (CPS) mode of programming to overcome lack of native support for function calling. First consider the case in which a tail site in a parent code module invokes a child code module. In this case, the virtual machine 1100 uses the dispatcher module 1112 to perform an explicit dispatch to the child function, within an existing dispatch loop provided by the dispatcher module 1112. The virtual machine 1100 also makes use of the explicit stack 1108 to perform its processing, since the implicit stack 1110 is not available for use in this implementation.

Next consider the case in which a non-tail site invokes a child code module. In this case, the virtual machine 1100 dynamically constructs a continuation function. A continuation function differs from the functions that are created by the composition mechanism 102 because a continuation function is created at runtime, not at composition time. The virtual machine 1100 may store the continuation function in the explicit stack 1108 and/or elsewhere. As will be clarified in the examples to follow, a continuation function performs appropriate bookkeeping to ensure that the results of an invoked child code module are made available to appropriate "downstream" consumers of this information. In other words, a continuation function explicitly propagates state in an appropriate manner to address the bookkeeping that would ordinarily be performed in an implicit manner using conventional call and return functionality, which is not available in the first implementation.

The example of FIG. 12 illustrates the above-described principles. The bubble labeled "Disp" 1202 represents a dispatch loop performed by the dispatcher module 1112. The Apply Blend code module 1204 represents the execution of a code module associated with the redStar function. This code module invokes two child code modules, a second child code module associated with the function redDiamond, and a first child code module associated with the function redSquare. A first collection 1206 of code modules represents the second child code module, while a second collection 1208 of code modules presents the first child code module. (Note that, in FIGS. 12-14, the pictorial duplication of certain code modules represents plural invocations of the same physical code module.) The Apply Blend code module then feeds the two color values generated by the two child code modules to the Blend code module 1210, associated with the function blendEvenly function.

The virtual machine 1100 handles the invocation of the second child code module by creating a first continuation function, k1. It handles the invocation of the first child code module by creating a second continuation function, k2. This operation is performed because the Apply Blend module invokes these two child code modules via respective non-tail sites in the Apply Blend code. On the other hand, the Apply Blend module invokes the Blend code module via a tail site in the Apply Blend code. To address this last invocation, the virtual machine 1100 uses the existing dispatcher loop to invoke the Blend code module, without creating another continuation function.

In summary, in the example of FIG. 12, all of the arrows represent indirect jumps performed via explicit dispatch, within a single dispatch loop. The pseudo-code examples which follow will further clarify the nature of the processing performed by the first implementation.

In the example of FIG. 13, the execution mechanism 104 now provides support for direct calls, but not indirect calls. First consider the case in which a tail site in a parent code module invokes a child code module. The virtual machine 1100 handles this case in the same manner as the first implementation. That is, the virtual machine 1100 performs explicit dispatch within an existing dispatcher loop. Next consider the case in which a non-tail site invokes a child code module. In this case, the virtual machine 1100 directly calls the dispatcher module 1112, to produce a new dispatcher loop.

The example of FIG. 13 illustrates the above-described principles. The bubble labeled "Disp" 1302 again represents an outer dispatch loop performed by the dispatcher module 1112. The Apply Blend code module 1304 again represents a code module associated with the redStar function. In this implementation, when the Apply Blend code module seeks to invoke the Rotate code module, the virtual machine 1100 makes a direct call to the dispatcher module 1112 to create a new dispatcher loop, represented by a "Disp" bubble 1306. The dispatcher module 1112 will then use explicit dispatch within that new dispatch loop to execute the Rotate, Mask Rect and Fixed Color code modules. When this new dispatch loop terminates, the virtual machine 1100 will return the result produced by the Rotate code module to the Apply Blend module.

Similarly, when the Apply Blend module seeks to invoke its second child code module, Mask Rect, the virtual machine 1100 invokes a new dispatch loop, represented by the "Displ" bubble 1308. The virtual machine 1100 executes the Mask Rect code module (and also the Fixed Color code module) within the new dispatch loop, and returns the result of that processing to the Apply Blend module when the new loop terminates.

On the other hand, the Apply Blend module again invokes the Blend module via a tail site. To perform this task, the virtual machine 1100 invokes the Blend code module via an explicit dispatch operation within the existing "outer" dispatch loop, without starting a new dispatch loop.

In summary, in the example of FIG. 13, all of solid-line arrows represent the indirect jumps performed via explicit dispatch. The dashed-line arrows represent direct calls made by the Apply Blend code module to its two (color) child code modules. The pseudo-code examples which follow will further clarify the nature of the processing summarized above.

In the example of FIG. 14, the execution mechanism 104 now also provides support for indirect calls. The virtual machine 1100 can make an indirect call by activating any type of pointer, object, etc. (rather than directly calling the name of the target code module). The manner in which the virtual machine 1100 implements indirect calls depends on two factors. A first factor depends on the nature of the site, within a parent code module, that invokes a particular child code module. In a first instance, that site may correspond to a tail site because no additional operations are performed in the parent code module after calling the child code module. In a second instance, that site may correspond to a non-tail site because further operations are performed following activation of the child code module. A second factor depends on the context in which the parent code module itself was invoked, referred to herein as the enclosing tail context. In a first instance, the parent code module was itself invoked by another higher-level code module as a final operation, e.g., via a tail-type of invocation in that other higher-level code module. In a second instance, the parent module was invoked by another high-level code module as a non-final operation, e.g., via a non-tail-type of invocation in that other higher-level code module.

(Rule 1) Tail Site, Tail Context.

For a tail invocation of a child code module that is invoked in an enclosing tail context, the virtual machine 1100 uses an existing dispatcher loop to execute the child code module.

(Rule 2) Non-Tail Site, Tail Context.

For a non-tail invocation of a child code module that is invoked in an enclosing tail context, the virtual machine 1100 uses an indirect call to invoke the child code module.

(Rule 3) Tail Site, Non-Tail Context.

For a tail invocation of a child code module that is invoked in an enclosing non-tail context, the virtual machine invokes a new dispatch loop to execute the child code module.

(Rule 4) Non-tail site, non-tail context. For a non-tail invocation of a child code module that is invoked in an enclosing non-tail context, the virtual machine 1100 uses an indirect call to execute the code module.

The example of FIG. 14 illustrates the above-described principles. The bubble labeled "Disp" 1402 again represents an outer dispatch loop performed by the dispatcher module 1112. The Apply Blend code module 1404 again represents a code module associated with the redStar function. In the third implementation, when the Apply Blend code module seeks to invoke the Rotate child code module, the virtual machine 1100 makes an indirect call to the Rotate code module 1406. To execute the child code module Mask Rect (of parent code module Rotate), the virtual machine 1100 then performs a direct call to the dispatcher module 1112 to invoke a new dispatch loop associated with the "Disp" bubble 1408.

More specifically, assume that the Apply Blend module is itself invoked in an enclosing context which can be characterized as "tail" in nature. In other words, the Apply Blend module is not called by a higher-level parent code module (not shown) via a non-tail call. As shown, the Apply Blend module itself invokes the Rotate code module via a non-tail site within the Apply Blend code. As such, the Apply Blend module can be said to invoke the Rotate child code module via a non-tail site in the Apply Blend code, within an enclosing tail context. Applying the Rule 2 set forth above, the virtual machine 1100 addresses this situation by using an indirect call to invoke the Mask Rect code module.

Now consider the manner in which the Rotate code module invokes its own child code module, namely Mask Rect. Here, the Rotate code module is invoked in a non-tail context. This is because the Apply Blend code module uses a non-tail call to invoke the Rotate code module. Further, the Rotate code module seeks to invoke its own child code module (Mask Rect) via a tail site in the Rotate code. Applying Rule 3 set forth above, the virtual machine 1100 addresses this situation by making a direct call to the dispatcher module 1112, which produces a new dispatch loop. Note, however, that the virtual machine 1100 does not use explicit dispatch to invoke the Rotate code module itself; instead, the Apply Blend code module invokes the Rotate code module via an indirect call.

The virtual machine 1100 handles the remainder of the calls in the control flow diagram of FIG. 14 in the same manner described above. That is, the virtual machine 1100 uses an indirect call to invoke its first child module, i.e., the Mask Rect code module. The virtual machine 1100 uses direct dispatch to invoke the Blend code module, within the existing outer dispatch loop. This is because, as per Rule 1, the Apply Blend code module is invoking the Blend code module via a tail site in the Apply Blend code module, and within an assumed tail context. If, on the other hand, the Apply Blend code module invoked its tail site in a non-tail context, then the virtual machine would invoke a new dispatch loop, as will be explained in further detail below.

In summary, in the example of FIG. 14, all of the solid-line arrows represent the indirect jumps performed via explicit dispatch. The dashed-line arrows represent direct calls that open a new dispatcher loop. The hollow-line arrows represent indirect calls. The pseudo-code examples which follow will further clarify the nature of the processing summarized above.

Note that, in the control flow diagram of FIG. 14, the virtual machine 1100 can omit two explicit dispatch operations (compared to the example of FIG. 13) through the use of indirect calls. That is, the Apply Blend code module invokes the Rotate code module and the Mask Rect code module via indirect call, rather than using the dispatcher module 1112 to invoke these modules via explicit dispatch. The virtual machine 1100, however, still uses the dispatcher module 1112 to invoke the further "downstream" child code modules. The virtual machine 1100 opts for this mixed strategy to leverage tail call elimination, e.g., so as to reduce the use of stack memory. That is, in this strategy, any dynamic chain of tail calls (including loops) will occupy one stack frame, rather than grow with the number of calls in the chain.

FIG. 15 describes the consumption of resources by the above-described three implementations. The resources include: the number of indirect jumps performed by the dispatcher module 1112; the number of direct calls (e.g., to invoke a new dispatch loop); the number of indirect calls; and the number of explicit stack operations. The virtual machine 1100 may perform explicit stack operations, for instance, to store intermediate results on the explicit stack 1108. The number of implicit stack operations is unknown because these are introduced by the underlying static compiler when the code modules are compiled.

In general, by moving from the first implementation (CPS mode) to the second implementation (direct calling mode), the virtual machine 1100 substitutes direct procedure calls for most of the explicit stack operations performed in the CPS mode, without altering the amount of explicit dispatching that is performed. Empirically, this change is found to significantly improve the performance of the virtual machine 1100, with respect to the execution of code that invokes child code modules via non-tail sites. By adding indirect calls (in the third implementation), the virtual machine 1100 can reduce dispatch overhead by a small amount, with a corresponding small gain in performance. A decline in performance is encountered when using indirect calls for all control transfers, that is, without deploying the illustrated hybrid solution (shown in FIG. 14) which uses indirect calling in combination with explicit dispatch. Once again, the use of explicit dispatch in the third implementation preserves tail call elimination, when possible.

With the above introduction, the remainder of this section will describe several pseudo-code excerpts. These pseudo-code excerpts will clarify the above-described principles in the context of concrete examples. To simplify description, these pseudo-code modules are hereinafter mainly described in terms of the invocations of functions, rather than the code modules associated with these functions.

Starting with FIG. 16, this pseudo-code excerpt describes one implementation of the dispatcher module 1112, for application in the first (CPS mode) implementation. In instruction (1), the dispatcher module 1112 reads the f value stored in the f register. The dispatcher module 1112 then invokes whatever function is associated with this f value—or, more precisely stated, whatever function is associated with the tag defined by the f value. In the first implementation (i.e., the CPS mode), the dispatcher module 1112 lacks the ability to call functions. Hence, in this mode, the dispatcher module 1112 can inline the code associated with the set of code modules that can be invoked; that is, the underlying compiler can produce this effect when it generates the code for the dispatcher module 1112. To invoke a particular code module, the dispatcher module 1112 runs its associated inlined code. For example, in instruction (3), the dispatcher module 1112 invokes the redSquare function, by running the inlined code associated with the Mask Rect code module, when the f value identifies this function. In instruction (4), the dispatcher module 1112 invokes the redStar function, by running the inlined code associated with the Apply Blend code module, when the f value identifies this function.

In instruction (1), the dispatcher module 1112 invokes code associated with a special "return" function, given an f value identifying this function. Execution of this "return" function causes the virtual machine 1100 to exit the dispatch loop and output its results to the output buffer 120.

For a top-level invocation, the evaluation module 1104 initializes the stack pointer (sp) register and sets the k value in the k register to the special "return" function. The evaluation module 1104 also loads an appropriate input data item to be processed into the v register (such as, in a graphics application, a particular pixel position in an iteration space). The evaluation module 1104 then transfers control to the dispatcher module 1112.

The second and third implementations can implement the dispatcher module 1112 in the same manner described above. But, in these two cases, the dispatcher module 1112 does not maintain (or use) a k value stored in a k register. And these implements make reduced use of the explicit stack 1108 compared to the first implementation. Further, in the second and third implementations, the dispatcher module 1112 may optionally make calls to the invoked code modules, rather than run inlined code associated with these code modules. Alternatively, in the second and third implementations, the dispatcher module 1112 may continue to run inlined code associated with the code modules that can be invoked.

FIG. 17 shows pseudo-code which represents one implementation of the Mask Rect code module, associated with the redSquare function, with respect to the first implementation. In instruction (1), the virtual machine 1100 obtains the child function (redPlane) from the environment data structure. In instruction (2), the virtual machine 1100 obtains the rectangle data from the environment data structure. In instruction (3), the virtual machine 1100 determines whether the input position (which is stored in the v register) lies within the rectangle. If so, in instruction (4), the virtual machine 1100 sets the f value of the f register to designate the child function, redPlane. If not, then in instruction (5), the virtual machine 1100 sets the f register to the k value, and sets the v register to the default value (0, 0, 0, 0). The virtual machine 1100 then returns to the dispatch loop, at which time the dispatcher module 1112 invokes the new function identified by the f register (which will correspond to either redPlane or "return").

FIG. 18 shows pseudo-code which represents one implementation of the Rotate code module, associated with the redDiamond function, for the first implementation. In instruction (1), the virtual machine 1100 obtains the child function (redSquare) from the environment data structure. In instruction (2), the virtual machine 1100 obtains the sine and cosine values that have been stored in the environment data structure by the constructor module shown in FIG. 10, and assigns these values to cos and sin, respectively. In instruction (3), the virtual machine 1100 obtains the position values from the v register, and assigns these values to the variables x and y. In instruction (4), the virtual machine 1100 determines positions (rx, ry) based on the x and y values and the cos and sin values. In instruction (5), the virtual machine 1100 stores the rx and ry values in the v register. In instruction (6), the virtual machine 1100 sets the f value in the f register to correspond to the child function (redSquare) that was read from the environment data structure in instruction (1). The virtual machine 1100 then returns to the dispatch loop, at which time the dispatcher module 1112 invokes the new function (redSquare) identified by the f register.

FIGS. 19, 20, and 21 show pseudo-code that is used to implement the Apply Blend code module, associated with the redStar function, in the first implementation. In instruction (1) of FIG. 19, the virtual machine 1100 first stores the original input k value in the explicit stack 1108. In instruction (2), the virtual machine 1100 stores the original input v value in the explicit stack 1108. In instruction (3), the virtual machine 1100 constructs a new continuation function (k1) that will receive the result of the second child function and then invoke the first child function. This continuation function has a tag applyBlend k1. In instruction (4), the virtual machine 1100 uses the (otherwise unused) index field k.index to provide a reference to the original function's environment index, i.e., designated by f.index. In instruction (5), the virtual machine 1100 sets the f value to the second child function, thereby instructing the dispatcher module 1112 to invoke the second child function when the dispatcher module 1112 is next called on.

FIG. 20 describes operations associated with the continuation function k1. In instruction (1), the virtual machine 1100 loads the position value from the explicit stack 1108, and assigns it to the variable temp. In instruction (2), the virtual machine 1100 saves the return value from the second child function onto the explicit stack 1108. In instruction (3), the virtual machine 1100 creates the next continuation function k2, which will receive the results of the first child function and invoke the third child function to blend the results of the first and second (color) child functions. In instruction (4), the virtual machine 1100 reuses the current environment by setting k.y equal to f.index. In instruction (5), the virtual machine 1100 sets the v value to the position value (currently assigned to temp). In instruction (6), the virtual machine 1100 sets the f register to the first child function, which prompts the dispatcher module 1112 to apply the first child function in its next invocation.

FIG. 21 describes operations associated with the continuation function k2. In instruction (1), the virtual machine 1100 reads the results of the second child function from the explicit stack 1108. Note that the v register currently stores the results of the first child function. In instruction (2), the virtual machine 1100 loads a k value into the k register corresponding to the initially-specified continuation function, as stored there via instruction (1) of FIG. 19. In instruction (3), the virtual machine 1100 pushes the results of the second child function back onto the explicit stack 1108. In instruction (4), the virtual machine 1100 sets the value of the f register to point to the third child function, to be invoked next by the dispatcher module 1112.

Advancing to FIG. 22, this figure shows one implementation of the Apply Blend code module (corresponding to the redStar function) for the second implementation (in which direct calling is permitting, but indirect calling is not). In instruction (1), the virtual machine 1100 stores the input value as temp. In instruction (2), the virtual machine 1100 sets the f register to designate the second child function. In instruction (3), the virtual machine 1100 invokes the second child function by making a direct call to the dispatcher module 1112. This operation commences a new dispatch loop. In instruction (4), the virtual machine 1100 stores the results of the second child function to the explicit stack 1108. In instruction (5), the virtual machine 1100 restores the input value to its original value (that it had at the outset of instruction (1)). In instruction (6), the virtual machine 1100 sets the f register to point to the first child function. In instruction (7), the virtual machine 1100 invokes the first child function by making a direct call to the dispatcher module 1112. In instruction (8), the virtual machine 1100 sets the f register to point to the third child function (i.e., the blendEvenly function). In instruction (9), the virtual machine 1100 invokes the third child function via the outer dispatch loop, that is, without making a direct call that will invoke a new dispatch loop.

Advancing to the third implementation (which permits indirect function calling), FIG. 23 describes one implementation of the Apply Blend code module (corresponding to the redStar function) for the case in which the Apply Blend code module is applied in a tail context, as opposed to a non-tail context (which corresponds to the example depicted in FIG. 14). In instruction (1), the virtual machine 1100 saves the input value as temp. In instruction (2), the virtual machine 1100 sets the f register to point to the second function. In instruction (3), the virtual machine 1100 uses an indirect call to invoke the second child function, e.g., via a pointer specified in a TC (tail context) pointer table. This operation will utilizes the resources of the implicit stack 1110, but not the explicit stack 1108. In instruction (4), the virtual machine 1100 pushes the results of the second child function to the explicit stack 1108. In instruction (6), the virtual machine 1100 sets the value of the f register to the first child function. In instruction (7), the virtual machine 1100 invokes the first child function via direct call. In instruction (8), the virtual machine 1100 sets the f register to point to the third child function (i.e., the blendEvenly function). In instruction (9), the virtual machine 1100 invokes the third child function by making an indirect jump using the existing dispatcher loop, that is, without making a direct call to the dispatcher module 1112 which will invoke a new dispatcher loop.

Finally, FIG. 24 describes one implementation of the Apply Blend code module for the case, in the third implementation, in which the Apply Blend code module is applied in a non-tail context. This pseudo-code is the same as example of FIG. 23, except for the last two instructions. That is, as per Rule 3, in instruction (9), the virtual machine 1100 invokes the blendEvenly function by making a direct call to the dispatcher module 1112, which commences a new dispatch loop. In instruction (10), the virtual machine 1100 returns the results of the direct call. Further note that the implicit call operations in FIG. 24 use an RC (recursive context) pointer table, rather than the TC pointer table of FIG. 23. These two tables ultimately point to different respective versions of the code modules being invoked (e.g., Fixed Color, Mask Rect, Rotate, Blend, and Apply Blend).

In one implementation, the virtual machine 1100 can produce the two separate functions shown in FIGS. 23 and 24 using two respective separate constructor modules. In another case, a single constructor module can produce a single function which implements both of the cases associated with FIGS. 23 and 24. That function (not shown) can include an appropriate branching instruction which forks the control flow to either the tail context code instructions or the non-tail context code instructions, while otherwise relying on a single instance of any instruction that is common to both the tail context case and the non-tail context case. That is, this single function will have the effect of invoking a new dispatcher loop for the tail-site/non-tail-context case, but not the other cases.

D. Illustrative Variations

This section describes a number of ways that the framework 100 can be modified. These variations are presented by way of illustration, not limitation; that is, the framework 100 can be extended in yet other ways, not expressly set forth herein.

The Use of Placeholder Functions.

In the examples set forth above, the composition mechanism 102 produces functions in an order that ensures that, at the time of creation of each function, all of its parameter values are known. However, this is not always possible. For example, consider a function which makes one or more recursive calls to itself. In this case, one of the arguments of the constructor module for this function corresponds to the function itself. But the constructor module cannot "fill in" the value of the function prior to the creation of the function.

To address this issue, the composition mechanism 102 can rely on placeholder functions. For example, consider the pseudo-code provided in FIG. 25. Assume that, at the outset, the composition mechanism 102 has not produced actual identifying values for functions f and g. In instruction (1), the composition mechanism 102 produces a placeholder function fp for the function f. In instruction (2), the composition mechanism 102 produces a placeholder function gp for the function g. In instruction (3), the composition mechanism 102 produces the function f using a constructor module that has the placeholder function gp as one of the input arguments. (Although not shown, it is also possible to produce the function f so that it recursively calls itself, in which case the constructor module would have the placeholder fp as one of its input arguments.) In instruction (4), the composition mechanism 102 associates the placeholder function fp with the actual value for f (which has been determined as per instruction (3)). In instruction (5), the composition mechanism 102 produces the function g using a constructor module that has the placeholder fp as one of its input arguments. In instruction (6), the composition mechanism 102 associates the placeholder function gp with the actual value of g (which has been determined in instruction (5)). In instruction (7), the composition mechanism 102 constructs a function h. The function h invokes functions f and g. In instruction (8), the composition mechanism 102 finalizes the function h. In instruction (9), the execution mechanism 104 runs the function h over an iteration space.

Instructions (8) and (9) can be implemented in different ways. In a first case, the finalize operation in instruction (8) may correspond to a no-op action (that performs no operation), or it can correspond to a safety-checking operation that ensures that all reachable placeholder functions have been bound to actual function values. In instruction (9), the execution mechanism 104 can dynamically replace the placeholder functions with the actual values, in the course of running the code for function h. This will involve indirection in the running of the code.

In another implementation, the finalize operation in instruction (8) can identify all occurrences of the placeholders functions, e.g., using any type of enumeration functionality. The finalize operation can then replace these placeholder functions with their corresponding actual function values. This operation makes the composition process more complex, but it may result in a more efficient execution of the resultant code module (because it does not involve runtime indirection).

In one implementation, a placeholder function can be implemented as a "trampoline" function that, upon activation, invokes its child function. For example, when activated, the trampoline function for the placeholder function fp invokes its child function f. When the bind instruction is invoked, it updates the trampoline's child function in the environment data structure.

Tail Call Optimization in the Execution Mechanism Language.

The composition mechanism 102 described above does not perform any tail call optimization on the code modules. However, in another implementation, the composition mechanism 102 can perform this operation. Tail call optimization entails configuring the code in such a manner so as to make efficient use of stack memory, e.g., by invoking tail calls whenever possible. In addition, or alternatively, an execution mechanism 104 can be designed to provide a complexity guarantee for the switch operation that is used in the dispatcher module 1112 and/or to provide a constant-time procedure-local indirect jump mechanism. These provisions will ensure that performance of the code does not degrade (or significantly degrade) with its increased complexity.

Higher Order Programming.

The framework 100 can be expanded to accommodate function construction during function execution, for example by parameterizing a code module with environment data stored in per-thread stack or heap storage, thus enabling a complete higher-order functional programming abstraction on the execution mechanism 104.

Out-of-Order Continuation Usage.

In the first implementation (that makes use of the CPS mode of programming), the framework 100 can accommodate out-of-order continuation usage. Out-of-order continuation usage may ensue from factors such as early exits, exceptions, etc. To accommodate this situation, the execution mechanism 104 can perform appropriate bookkeeping to ensure that values stored in the registers and stack are updated as the stack is unrolled. Along these lines, in some implementations, the execution mechanism 104 can optionally wrap non-tail calls with stack allocation and de-allocation operations.

Compilation.

In the examples set forth above, neither the composition mechanism 102 nor the execution mechanism 104 performs any compilation (beyond the advance compilation of the code modules themselves). In another implementation, the composition mechanism 102 can perform some amount of static compilation. Alternatively, or in addition, the execution mechanism 104 can perform some amount of runtime compilation. In these implementations, the composition mechanism 102 produces a kernel having some undefined environment slots in the environment data structure. The compilation process (static or runtime) can operate on this partial environment data structure to achieve any compilation objectives. For example, the compilation process can inline child function calls with known function values, thus removing dispatch costs in the execution of this code. The framework 100 otherwise continues to leverage the use of pre-compiled code modules in the manner described above.

E. Representative Computing Functionality

Figure 26:
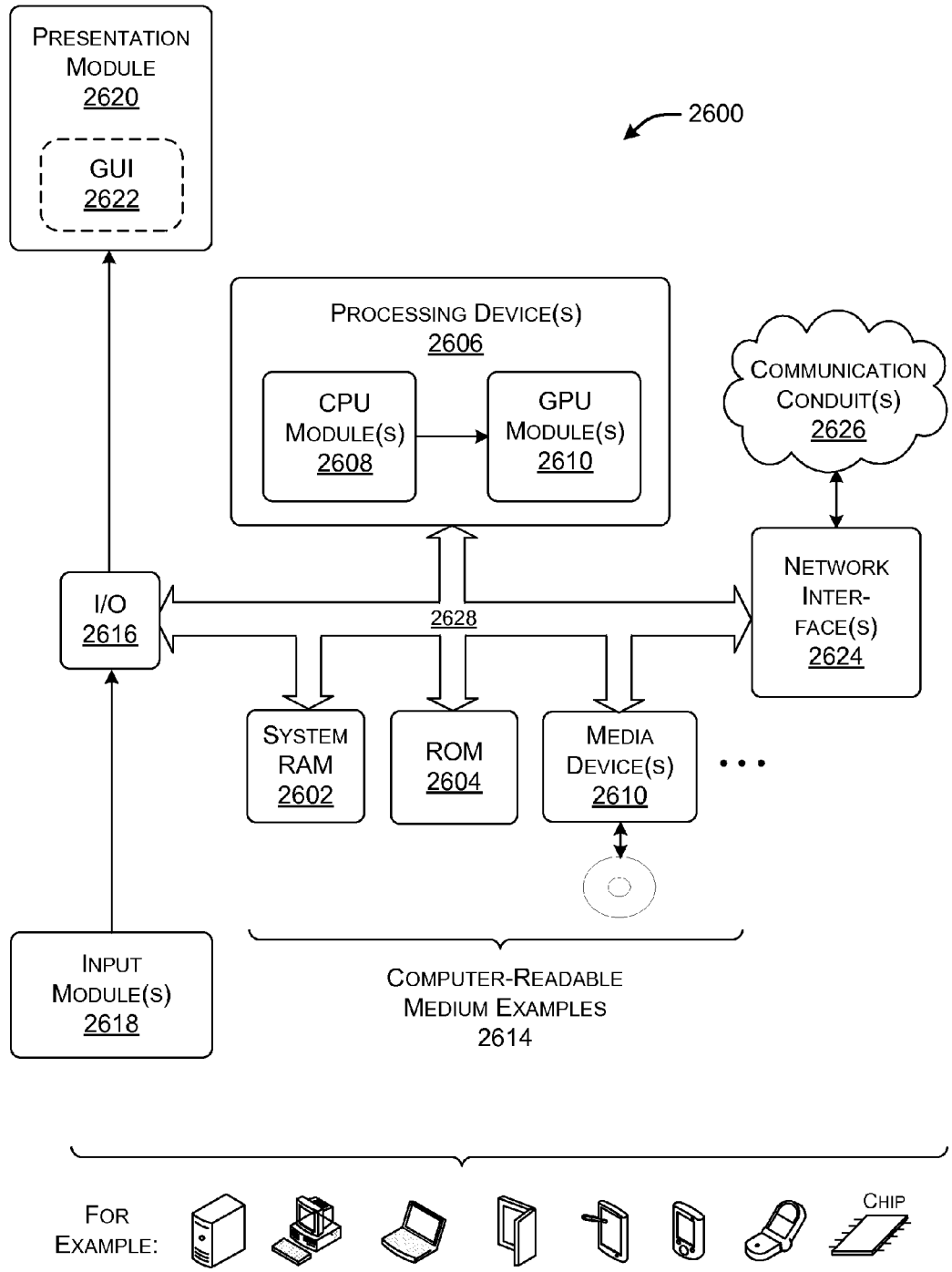
FIG. 26 shows illustrative computing functionality that can be used to implement the framework of FIG. 1.

FIG. 26 sets forth illustrative computing functionality 2600 that can be used to implement any aspect of the functions described above. For example, the type of computing functionality 2600 shown in FIG. 26 can be used to implement any aspect of the composition mechanism 102 and/or the execution mechanism 104. In all cases, the computing functionality 2600 represents one or more physical and tangible processing mechanisms.

The computing functionality 2600 can include volatile and non-volatile memory, such as RAM 2602 and ROM 2604, as well as one or more processing devices 2606. For example, the processing devices 2606 may include one or more CPU modules 2608 and one or more GPU modules 2610. For instance, the CPU modules 2608 can be used to implement the composition mechanism 102, while the GPU modules 2610 can be used to implement the execution mechanism 104.

The computing functionality 2600 also optionally includes various media devices 2612, such as a hard disk module, an optical disk module, and so forth. The computing functionality 2600 can perform various operations identified above when the processing device(s) 2606 executes instructions that are maintained by memory (e.g., RAM 2602, ROM 2604, or elsewhere). The processing devices 2606 may also include local memory components, such as registers, buffers, etc.

More generally, instructions and other information can be stored on any computer readable medium 2614, including, but not limited to, static memory storage devices, magnetic storage devices, optical storage devices, and so on. The term computer readable medium also encompasses plural storage devices. In all cases, the computer readable medium 2614 represents some form of physical and tangible entity.

The computing functionality 2600 also includes an input/output module 2616 for receiving various inputs (via input modules 2618), and for providing various outputs (via output modules). One particular output mechanism may include a presentation module 2620 and an associated graphical user interface (GUI) 2622. The computing functionality 2600 can also include one or more network interfaces 2624 for exchanging data with other devices via one or more communication conduits 2626. One or more communication buses 2628 communicatively couple the above-described components together.

The communication conduit(s) 2626 can be implemented in any manner, e.g., by a local area network, a wide area network (e.g., the Internet), etc., or any combination thereof. The communication conduit(s) 2626 can include any combination of hardwired links, wireless links, routers, gateway functionality, name servers, etc., governed by any protocol or combination of protocols.

Figure 27:
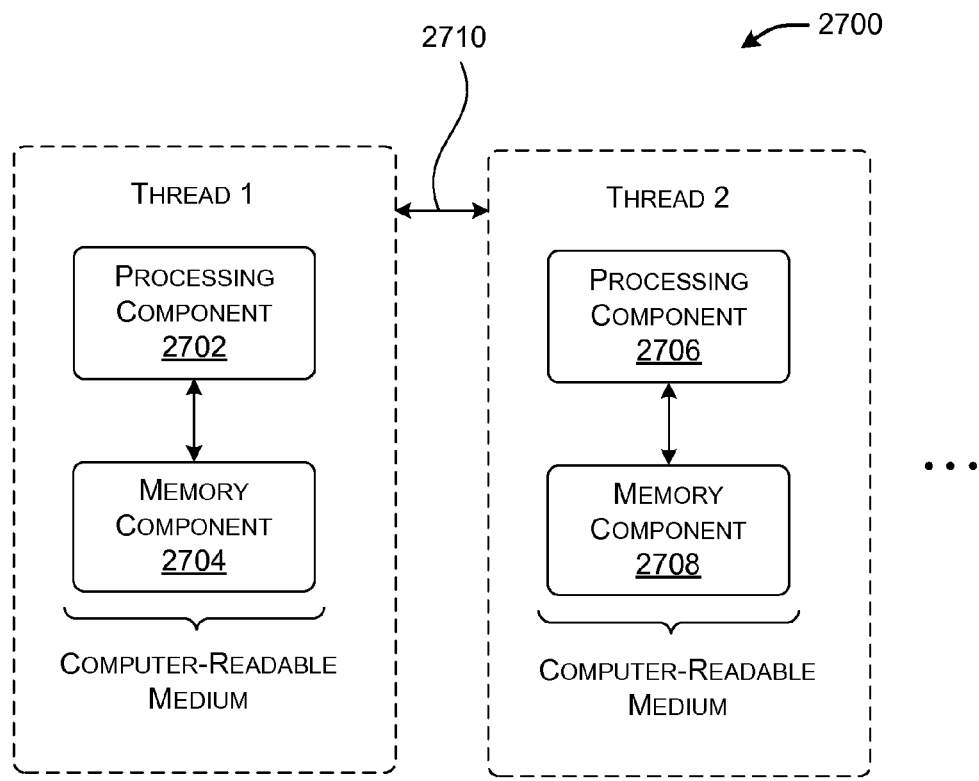
FIG. 27 shows one illustrative implementation of a graphical processing unit (GPU) module that can be used to implement the execution mechanism.

FIG. 27 shows the details of a GPU module 2700. As said, the GPU module 2700 may, in one case, implement the execution mechanism 104. The GPU module 2700 may be hosted by the computing functionality 2600 of FIG. 26 (e.g., corresponding to the GPU module 2610 shown in that figure), or some other host system.

The GPU module 2700 includes plural threads (only two of which are shown for simplicity). For example, the GPU module 2700 can include 64 threads, 128 threads, etc. The threads may optionally be associated with two or more thread groups. Thread 1 can include a processing component 2702 in conjunction with a memory component 2704. For example, the processing component 2702 may correspond to a pixel shader engine or the like. The memory component 2704 may correspond to register memory, buffer memory, etc. Similarly, thread 2 can include a processing component 2706 in conjunction with a memory component 2708. In one implementation, the threads in a thread group may communicate with each other in limited circumstances (as indicated by the double-headed arrow 2710).

Alternatively, or in addition, any of the functions described in the preceding sections can be performed, at least in part, by one or more other hardware logic components. For example, without limitation, the computing functionality can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc.

In closing, the description may have described various concepts in the context of illustrative challenges or problems. This manner of explanation does not constitute an admission that others have appreciated and/or articulated the challenges or problems in the manner specified herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   in a composition mechanism executing on a first processing unit, generating function data associated with a kernel;
   transferring the function data from the first processing unit to a second processing unit, the function data specifying a caller-callee relationship between a parent function implemented by a parent pre-compiled code module and a child function implemented by a child pre-compiled code module, the parent pre-compiled code module and the child pre-compiled code module being available at the second processing unit before the function data specifying the caller-callee relationship is transferred from the first processing unit to the second processing unit; and
   at an execution mechanism executing on the second processing unit:
   receiving the function data from the first processing unit;
   receiving input data;
   processing the input data with the kernel by dynamically invoking the parent pre-compiled code module to implement the parent function and the child pre-compiled code module to implement the child function, the child function being called by the parent function as specified by the function data received from the first processing unit; and
   providing output data of the kernel.

2. The method of claim 1, wherein the first processing unit is a central processing unit.

3. The method of claim 2, wherein the second processing unit is a graphical processing unit.

4. The method of claim 1, wherein the execution mechanism includes a plurality of evaluation modules that operate in parallel, each evaluation module executing an instance of the kernel with respect to an input data item selected from an iteration space associated with the input data.

5. The method of claim 1, wherein the function data includes a first parameter identifying the parent pre-compiled code module, a second parameter identifying the child pre-compiled code module, and a numerical value that is applied to the input data by the child pre-compiled code module.

6. The method of claim 1, wherein:
the execution mechanism does not provide native support for direct function calls and does not provide native support for indirect function calls, and
said dynamically invoking involves executing a tail invocation of the child pre-compiled code module using a dispatcher module within an existing dispatch loop provided by the dispatcher module.

7. The method of claim 1, wherein:
the execution mechanism does not provide native support for direct function calls and does not provide native support for indirect function calls, and
said dynamically invoking involves executing a non-tail invocation of the child function by creating a continuation function, the continuation function being configured to receive a result of the child pre-compiled code module and invoke a subsequent operation of the kernel.

8. The method of claim 1, wherein:
the execution mechanism provides native support for direct function calls but does not provide native support for indirect function calls, and
said dynamically invoking involves executing a tail invocation of the child pre-compiled code module using a dispatcher module within an existing dispatch loop provided by the dispatcher module.

9. The method of claim 1, wherein:
the execution mechanism provides native support for direct function calls but does not provide native support for indirect function calls, and
said dynamically invoking involves executing a non-tail invocation of the child pre-compiled code module by directly calling a dispatcher module to create a new dispatcher loop in which the child pre-compiled code module is executed.

10. The method of claim 1, wherein:
the execution mechanism provides native support for direct function calls and provides native support for indirect function calls, and
said dynamically invoking involves, for a tail invocation of the child pre-compiled code module that is invoked in an enclosing tail context, using an existing dispatcher loop, providing by a dispatcher module, to execute the child pre-compiled code module.

11. The method of claim 1, wherein:
the execution mechanism provides native support for direct function calls and provides native support for indirect function calls, and
said dynamically invoking involves, for a non-tail invocation of the child pre-compiled code module that is invoked in an enclosing tail context, using an indirect call to invoke the child pre-compiled code module.

12. The method of claim 1, wherein:
the execution mechanism provides native support for direct function calls and provides native support for indirect function calls, and
said dynamically invoking involves, for a tail invocation of the child function that is invoked in an enclosing non-tail context, calling a dispatcher module to create a new dispatcher loop in which the child pre-compiled code module is executed.

13. The method of claim 1, wherein:
the execution mechanism provides native support for direct function calls and provides native support for indirect function calls, and
said dynamically invoking involves, for a non-tail invocation of the child pre-compiled code module that is invoked in an enclosing non-tail context, using an indirect call to execute the child pre-compiled code module.

14. A system comprising:
a first processing unit;
a second processing unit;
an execution mechanism configured to execute on the second processing unit, the execution mechanism comprising a plurality of pre-compiled code modules including a first pre-compiled code module and a second pre-compiled code module; and
a composition mechanism configured to execute on the first processing unit, the composition mechanism being configured to, after the first pre-compiled code module and the second pre-compiled code module have been installed at the execution mechanism:
generate function data that parametrically specifies a kernel having a parent function implemented by the first pre-compiled code module of the execution mechanism and a child function implemented by the second pre-compiled code module of the execution mechanism, the function data specifying a calling relationship between the parent function and the child function; and
transfer the function data specifying the calling relationship from the first processing unit to the second processing unit,
wherein the execution mechanism is configured to:
execute the kernel by dynamically invoking the first pre-compiled code module and the second pre-compiled code module to process input data to provide output data.

15. The system of claim 14, wherein the first processing unit is a central processing unit and the second processing unit is a graphical processing unit.

16. The system of claim 14, wherein the execution mechanism is configured to invoke a constructor associated with the parent function by passing an argument identifying the child function to the constructor.

17. The system of claim 14, wherein the function data generated by the composition mechanism specifies a constant value used by the kernel when executed by the execution mechanism.

18. The system of claim 14, wherein:
the execution mechanism does not provide direct native support for function calls and does not provide indirect native support for function calls, and
the execution mechanism comprises at least one evaluation module that includes:
a continuation value store for storing a continuation value, the continuation value identifying a subsequent pre-compiled code module to be executed following execution of a currently-executing pre-compiled code module; and
an explicit stack for storing values produced and consumed by the pre-compiled code modules.

19. A system comprising:
a graphical processing unit (GPU) having GPU instructions and a plurality of pre-compiled code modules, the plurality of pre-compiled code modules including at least a first pre-compiled code module and a second pre-compiled code module; and a central processing unit (CPU) having CPU instructions which, when executed by the CPU, cause the CPU to:
parametrically specify a kernel using function data that specifies a function call relationship between a first function implemented by the first pre-compiled code module and a second function implemented by the second pre-compiled code module; and
transfer the function data specifying the function call relationship from the CPU to the GPU, wherein the GPU instructions, when executed by the GPU, cause the GPU to execute the kernel according to the function data responsive to receipt of the function data by the GPU from the CPU, and wherein the first pre-compiled code module and the second pre-compiled code module are present on the GPU when the function data specifying the function call relationship is transferred from the CPU to the GPU.

20. The system of claim 19, wherein:
the GPU instructions, when executed by the GPU, cause the GPU to execute the first function on the GPU and cause the first function to call the second function on the GPU as specified by the function data received from the CPU.

21. The system of claim 19, wherein the GPU instructions, when executed by the GPU, cause the GPU to process input pixel positions with the kernel to produce output pixel color values.

22. The system of claim 19,
wherein the CPU instructions, when executed by the CPU, cause the CPU to:
parametrically specify another kernel using other function data that specifies another function call relationship between other functions implemented by the first pre-compiled code module and the second pre-compiled code module; and
transfer the other function data specifying the another function call relationship from the CPU to the GPU,
wherein the GPU instructions, when executed by the GPU, cause the GPU to execute the another kernel as specified by the other function data after receiving the other function data from the CPU, and
wherein the first pre-compiled code module and the second pre-compiled code module are present on the GPU when the other function data specifying the another function call relationship is transferred from the CPU to the GPU.

* * * * *